(12) United States Patent
Okubo

(10) Patent No.: US 8,625,204 B2
(45) Date of Patent: Jan. 7, 2014

(54) ZOOM LENS AND IMAGE PICKUP APPARATUS INCLUDING THE ZOOM LENS

(75) Inventor: Yosuke Okubo, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/413,901

(22) Filed: Mar. 7, 2012

(65) Prior Publication Data

US 2012/0242885 A1   Sep. 27, 2012

(30) Foreign Application Priority Data

Mar. 24, 2011   (JP) .................................. 2011-065870

(51) Int. Cl.
*G02B 15/14* (2006.01)

(52) U.S. Cl.
USPC .......................................... 359/687; 359/686

(58) Field of Classification Search
USPC .................. 359/686–689, 771, 774
See application file for complete search history.

(56) References Cited

U.S. PATENT DOCUMENTS 7,830,613 B2    11/2010  Ichikawa
2009/0296232 A1 *  12/2009  Okada .......................... 359/689

* cited by examiner

*Primary Examiner* — Scott J Sugarman
*Assistant Examiner* — Daniele Manikeu
(74) *Attorney, Agent, or Firm* — Canon USA Inc. IP Division

(57) ABSTRACT

A zoom lens includes a first lens unit having a positive refractive power, a second lens unit having a negative refractive power, a third lens unit having a positive refractive power, and a fourth lens unit having a negative refractive power. The first to fourth lens units are arranged in order from the object side to the image side. All of the lens units are moved during zooming from the wide-angle end to the telephoto end. In the zoom lens, a number of lenses in each of the lens units, imaging magnifications on the telephoto end and the wide-angle end of the second lens unit and the third lens unit, a sum of thicknesses on the optical axis of the first lens unit and the second lens unit, and focal lengths of the entire zoom lens at a wide-angle end and at a telephoto end are appropriately set.

18 Claims, 25 Drawing Sheets

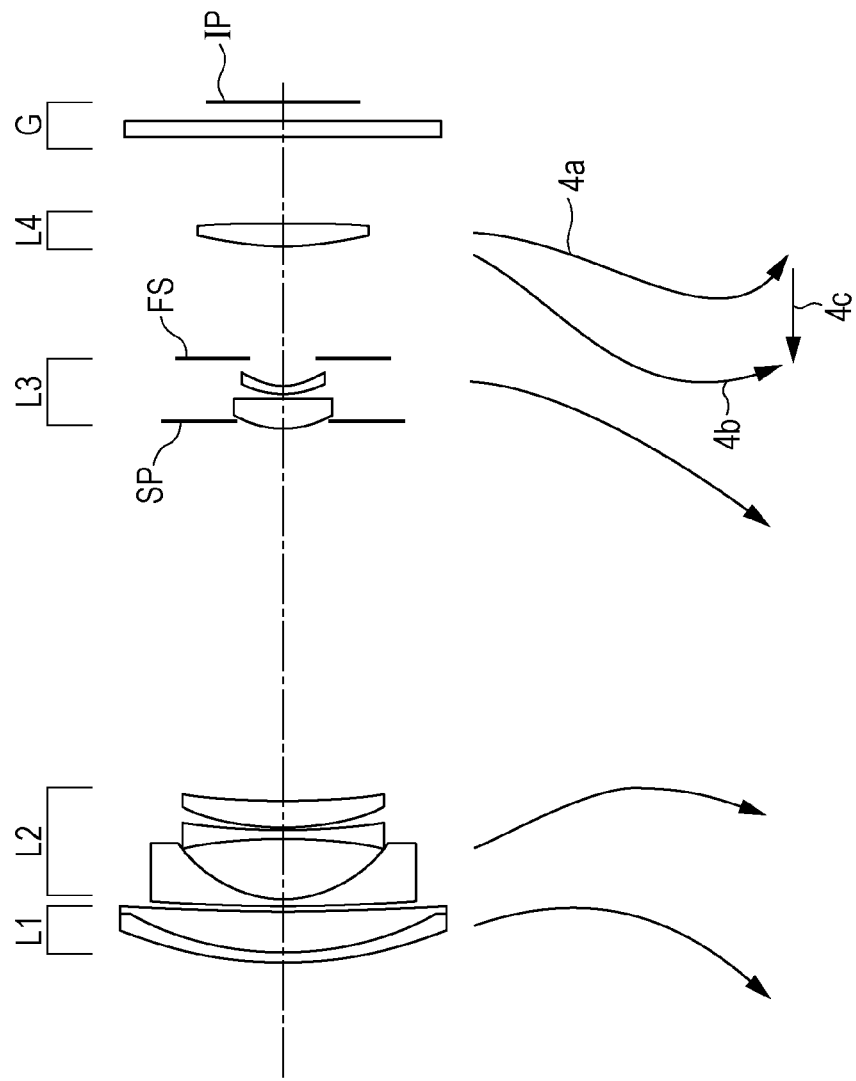

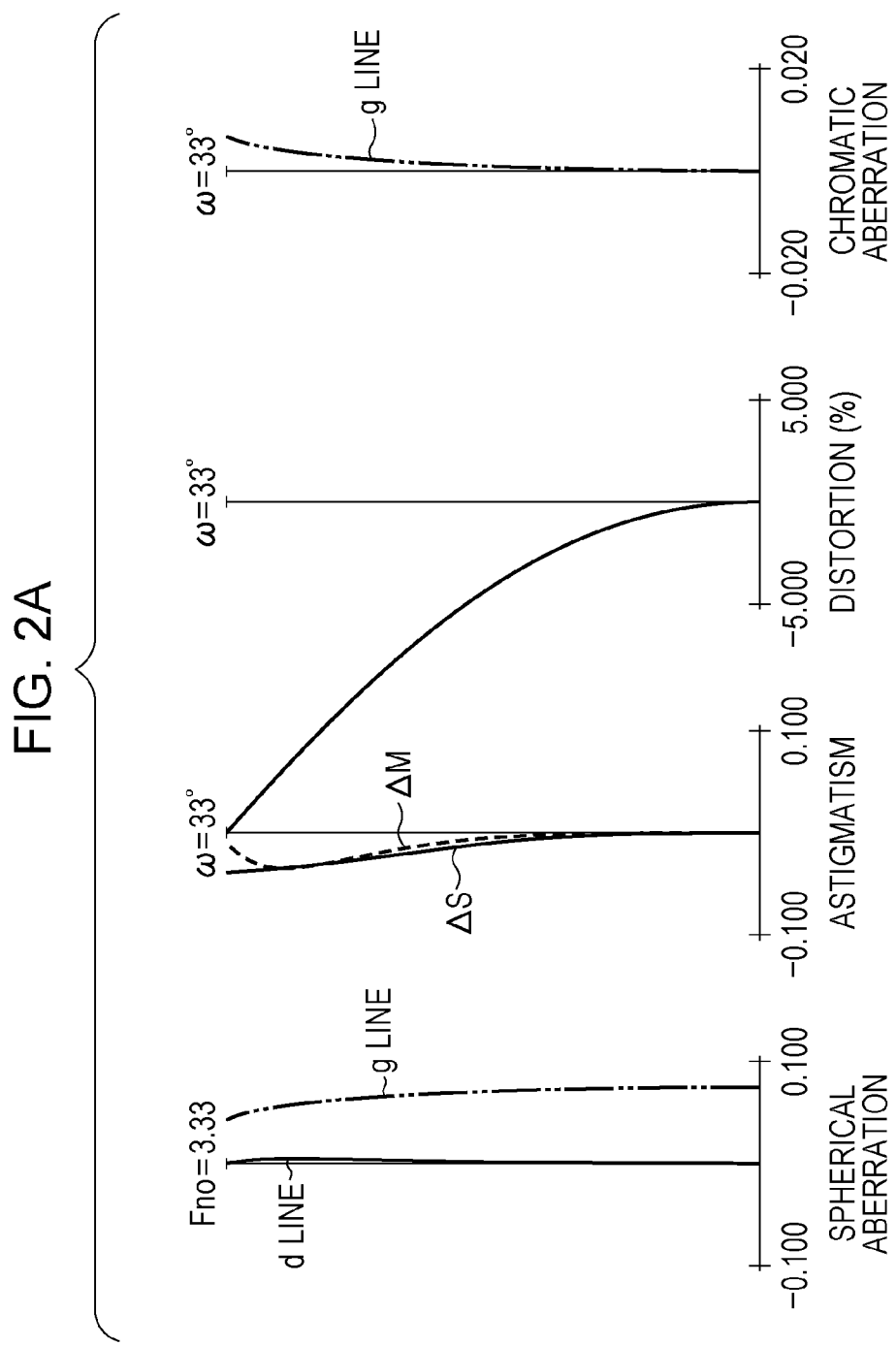

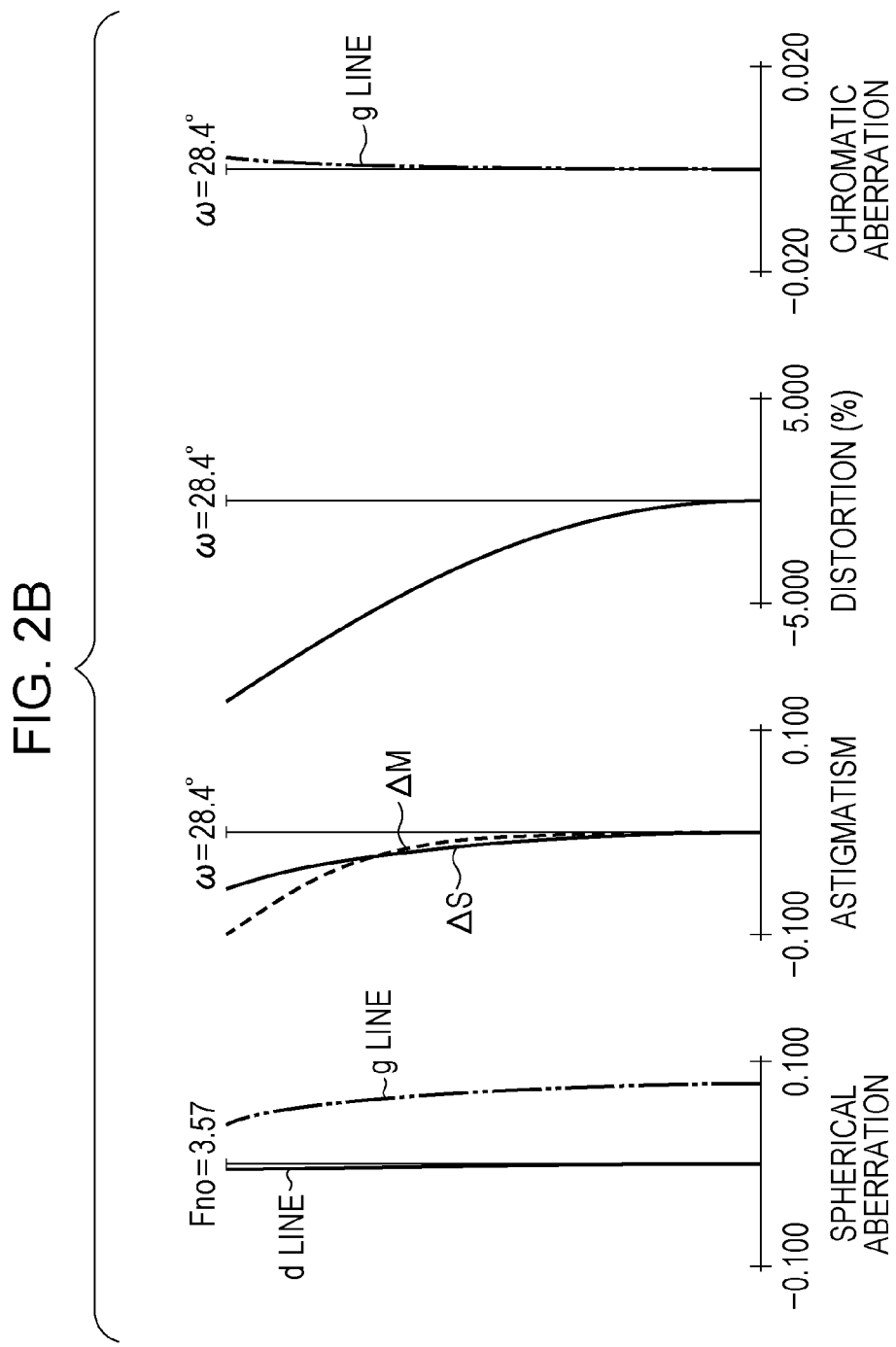

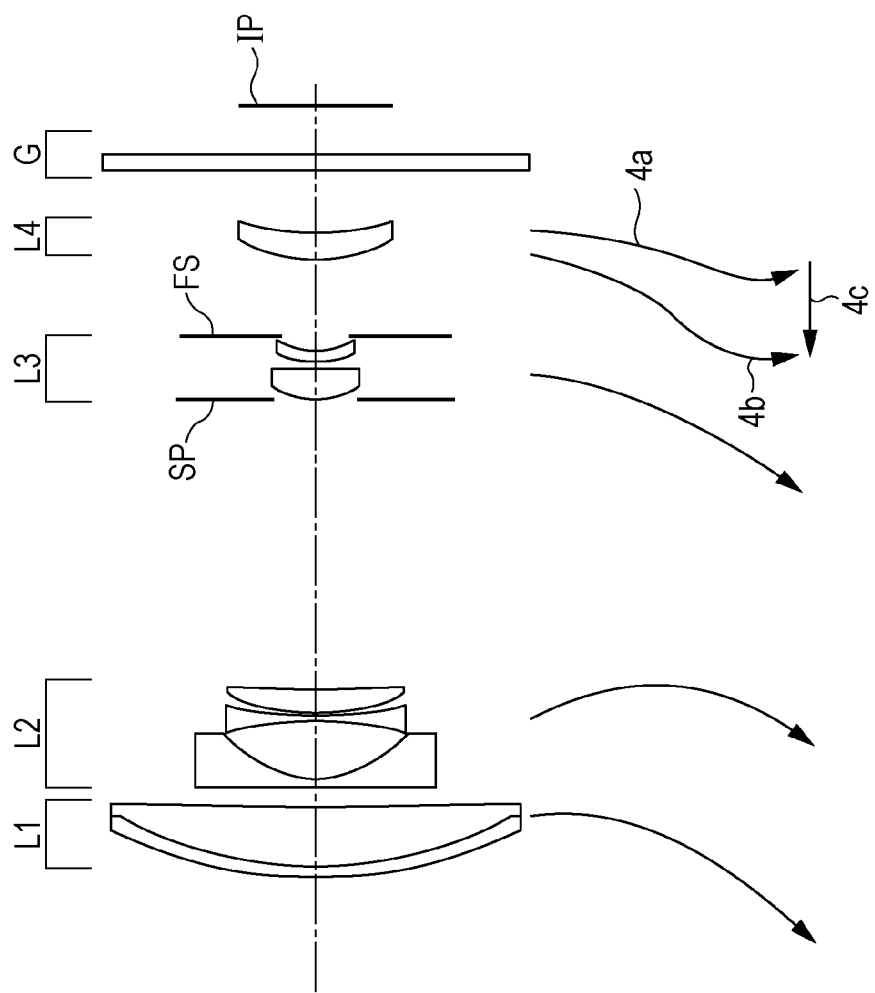

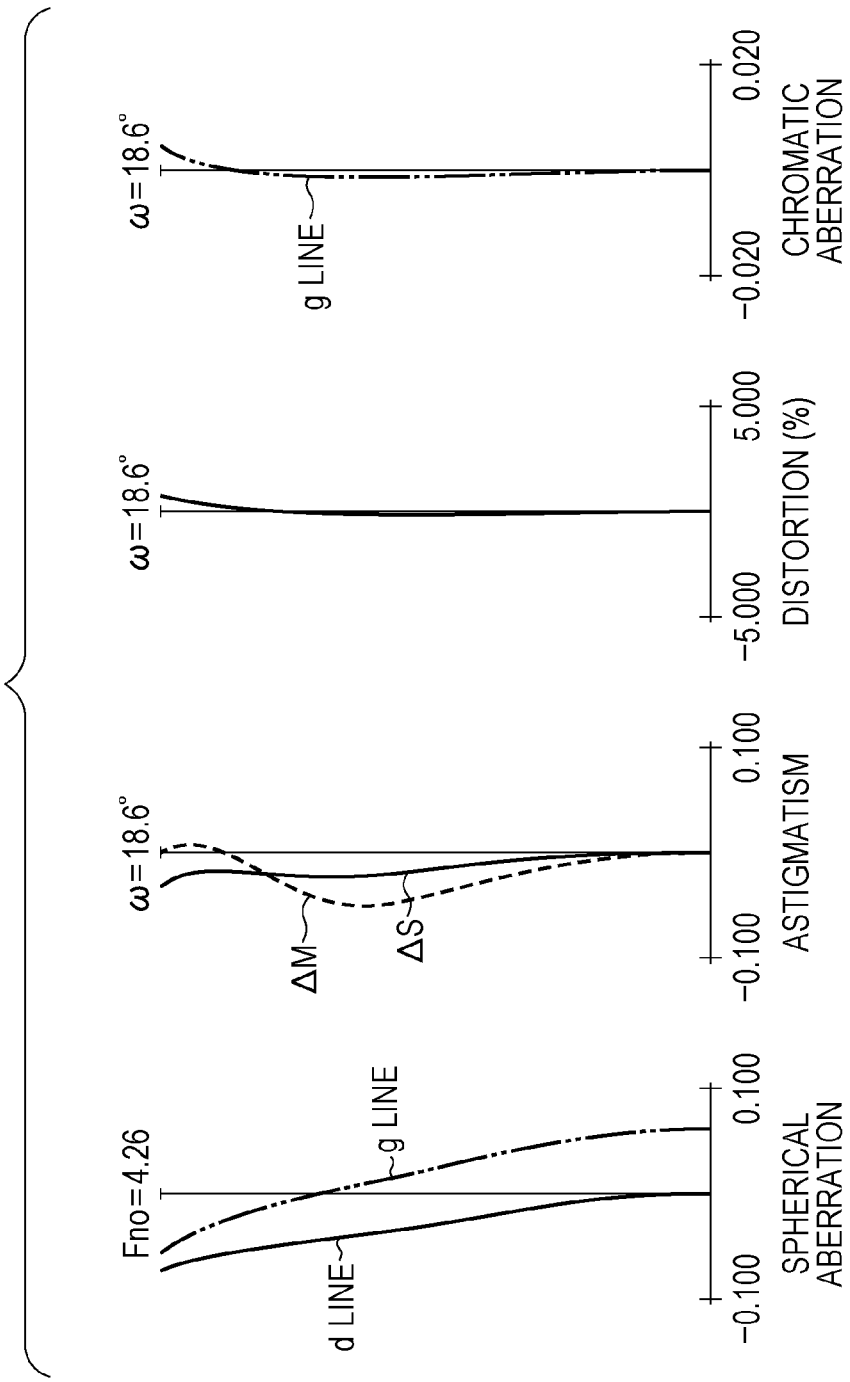

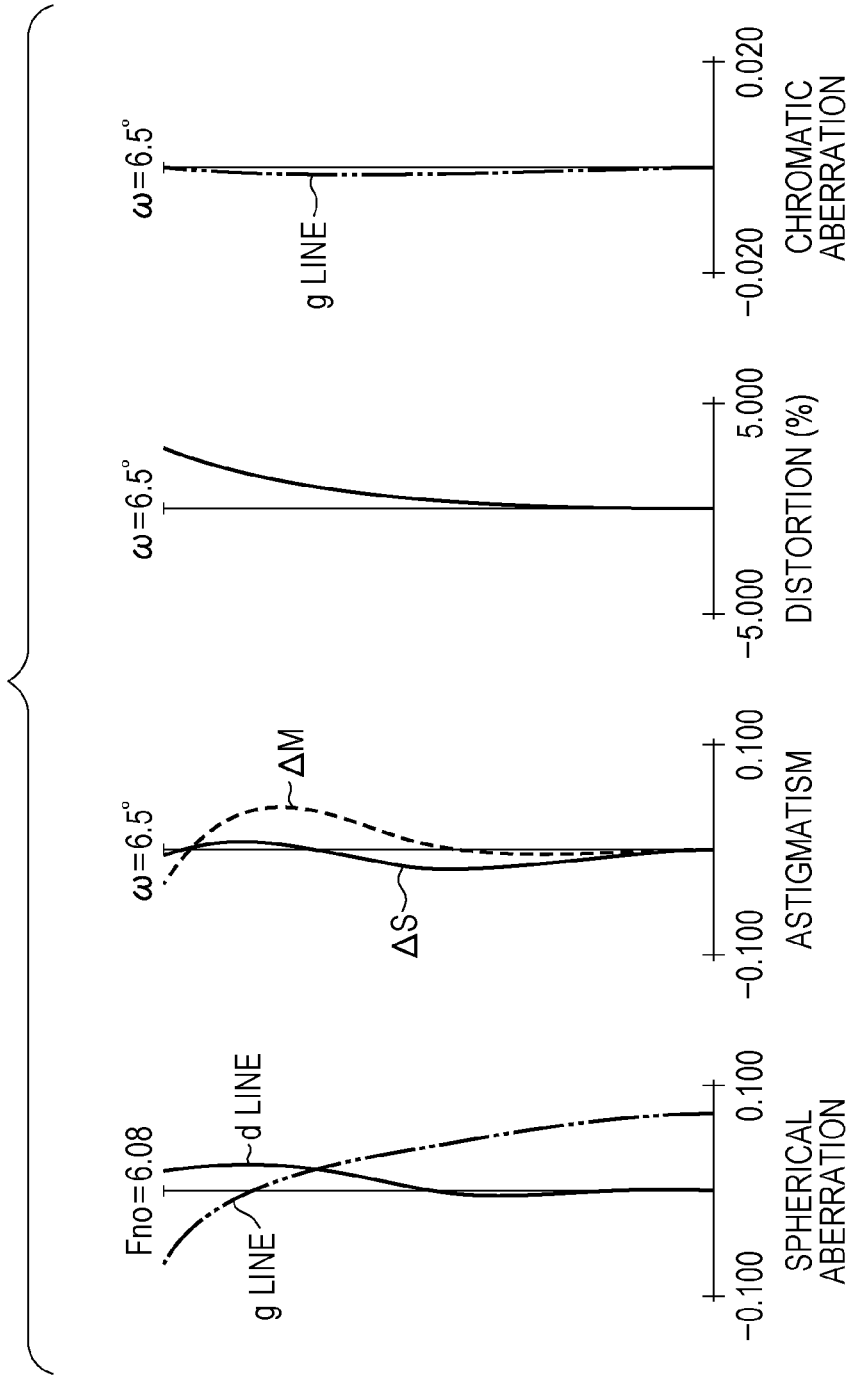

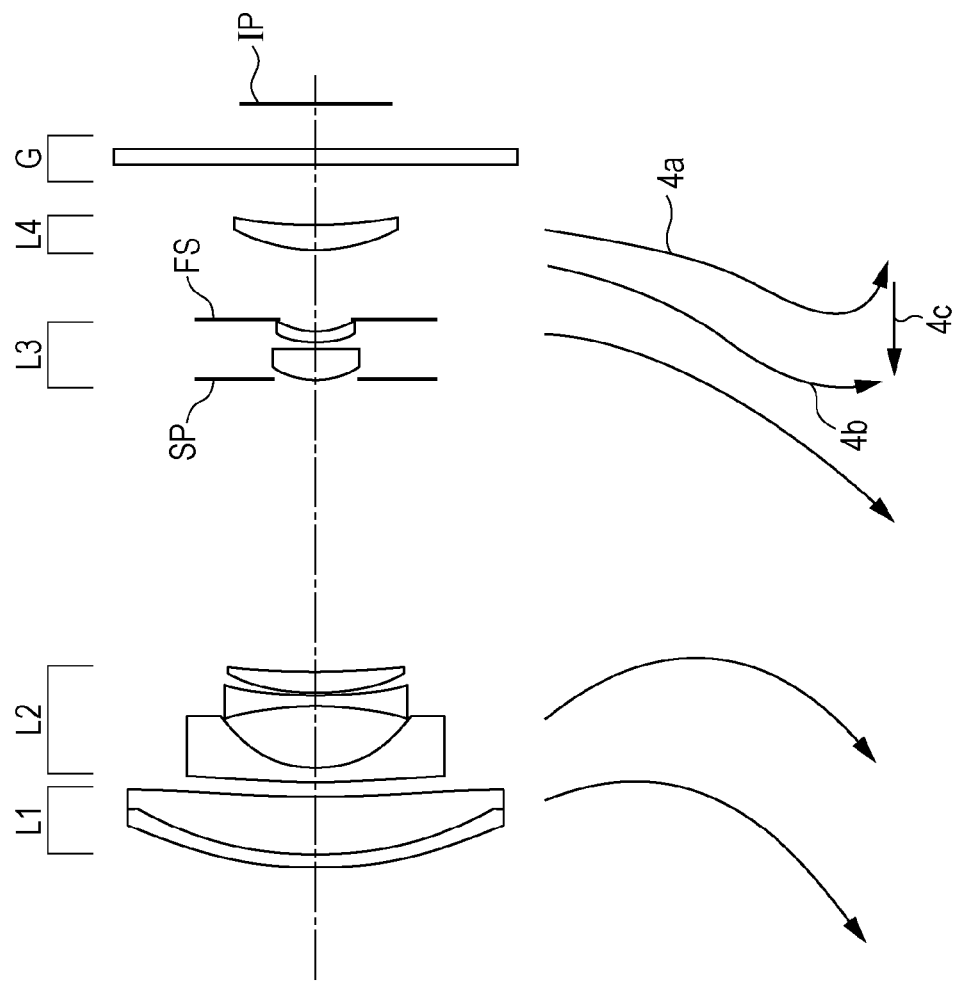

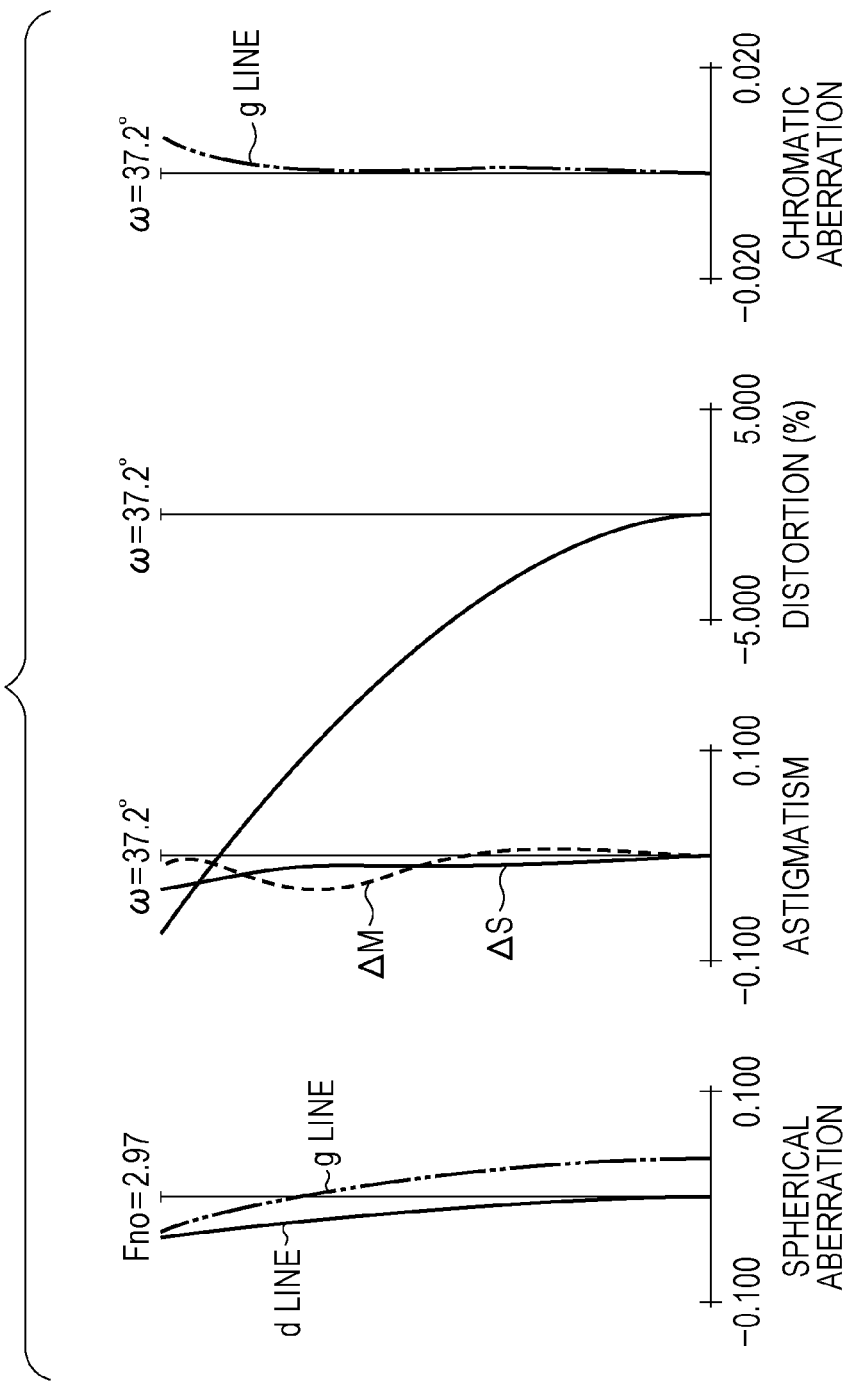

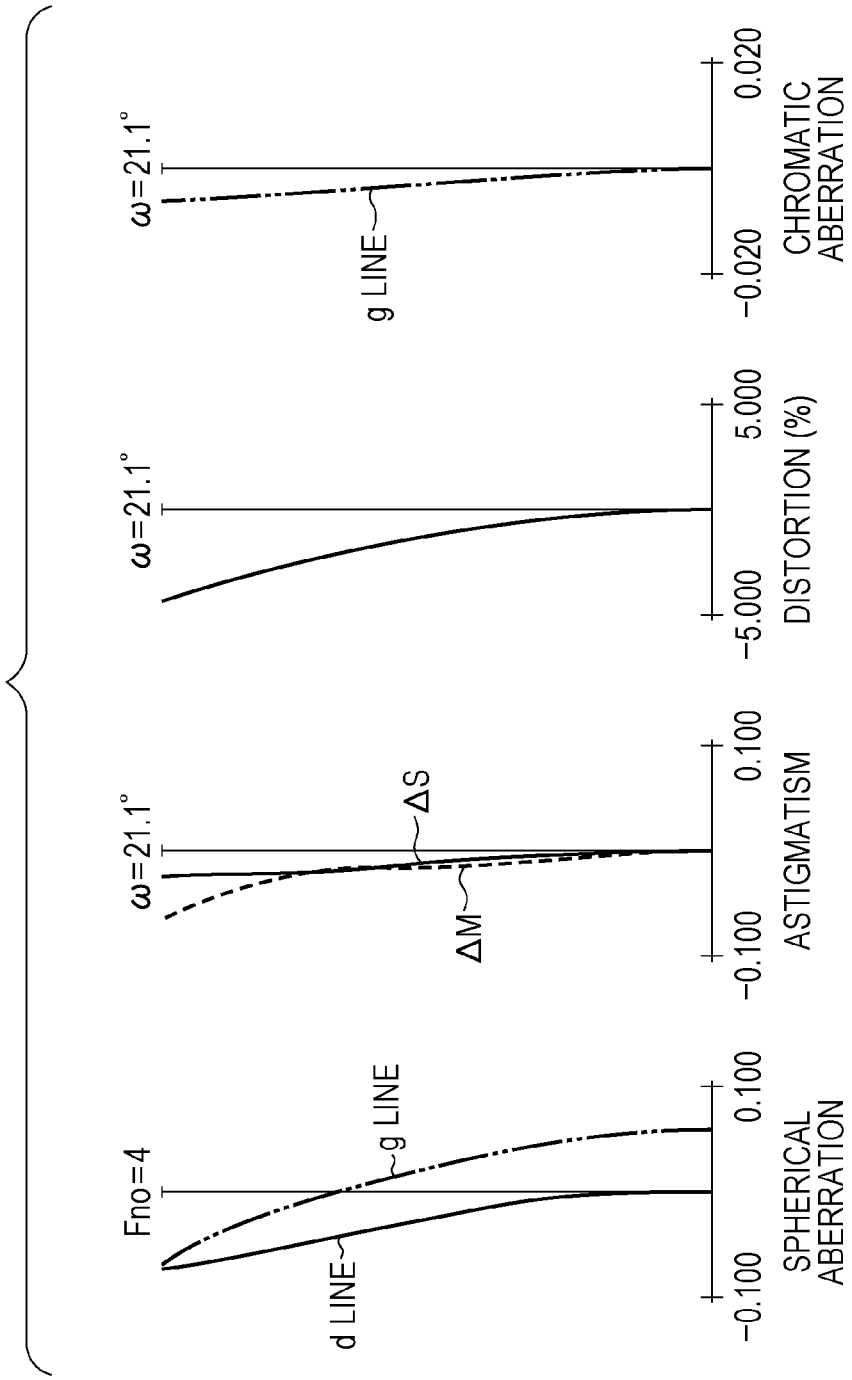

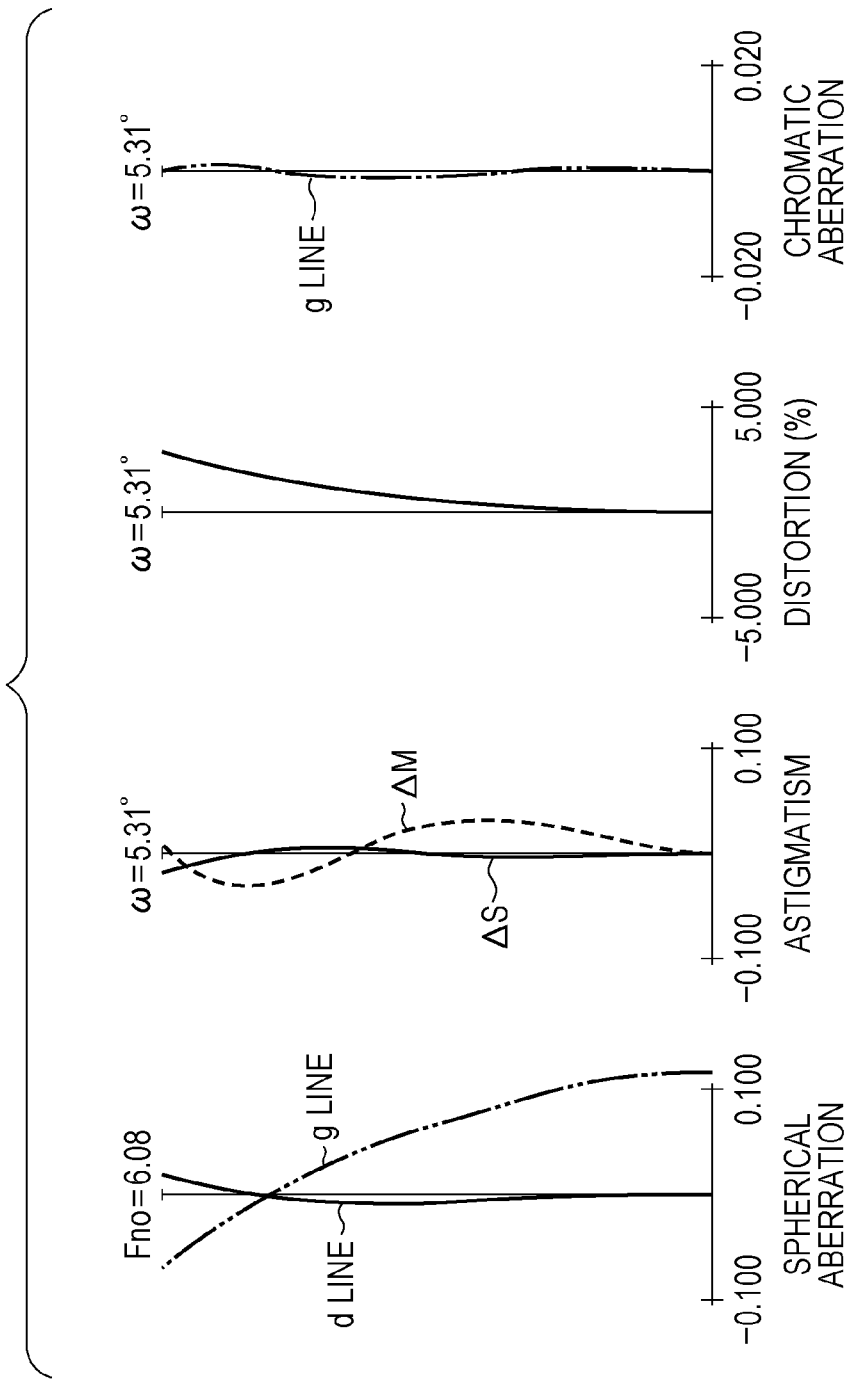

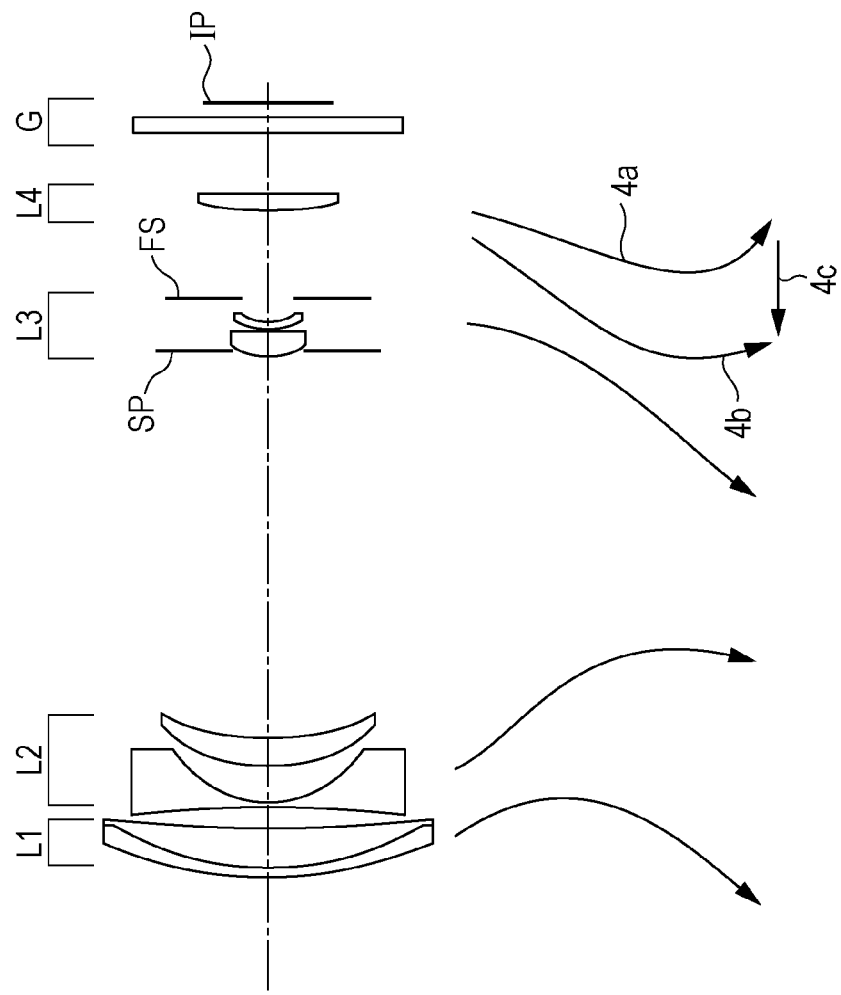

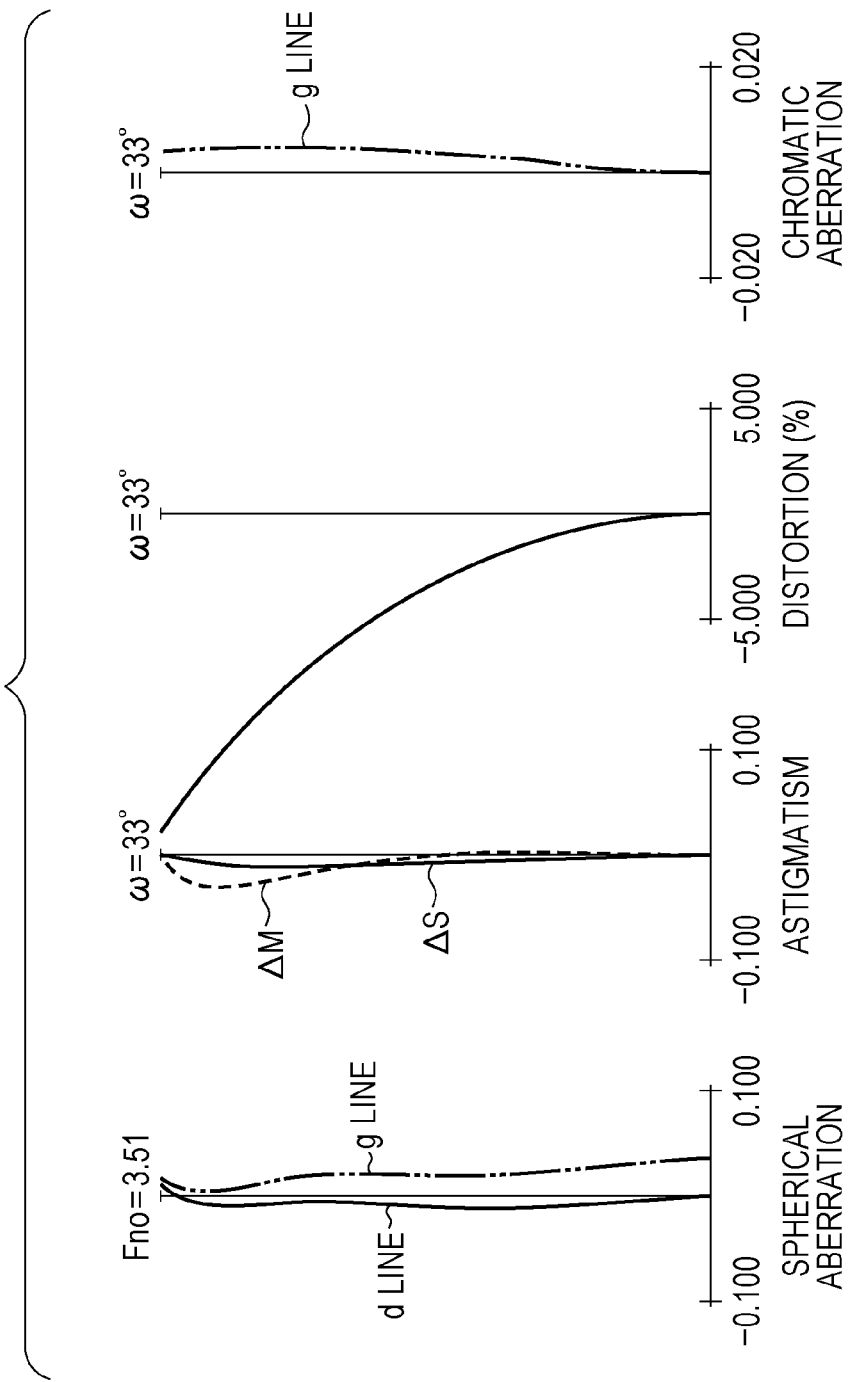

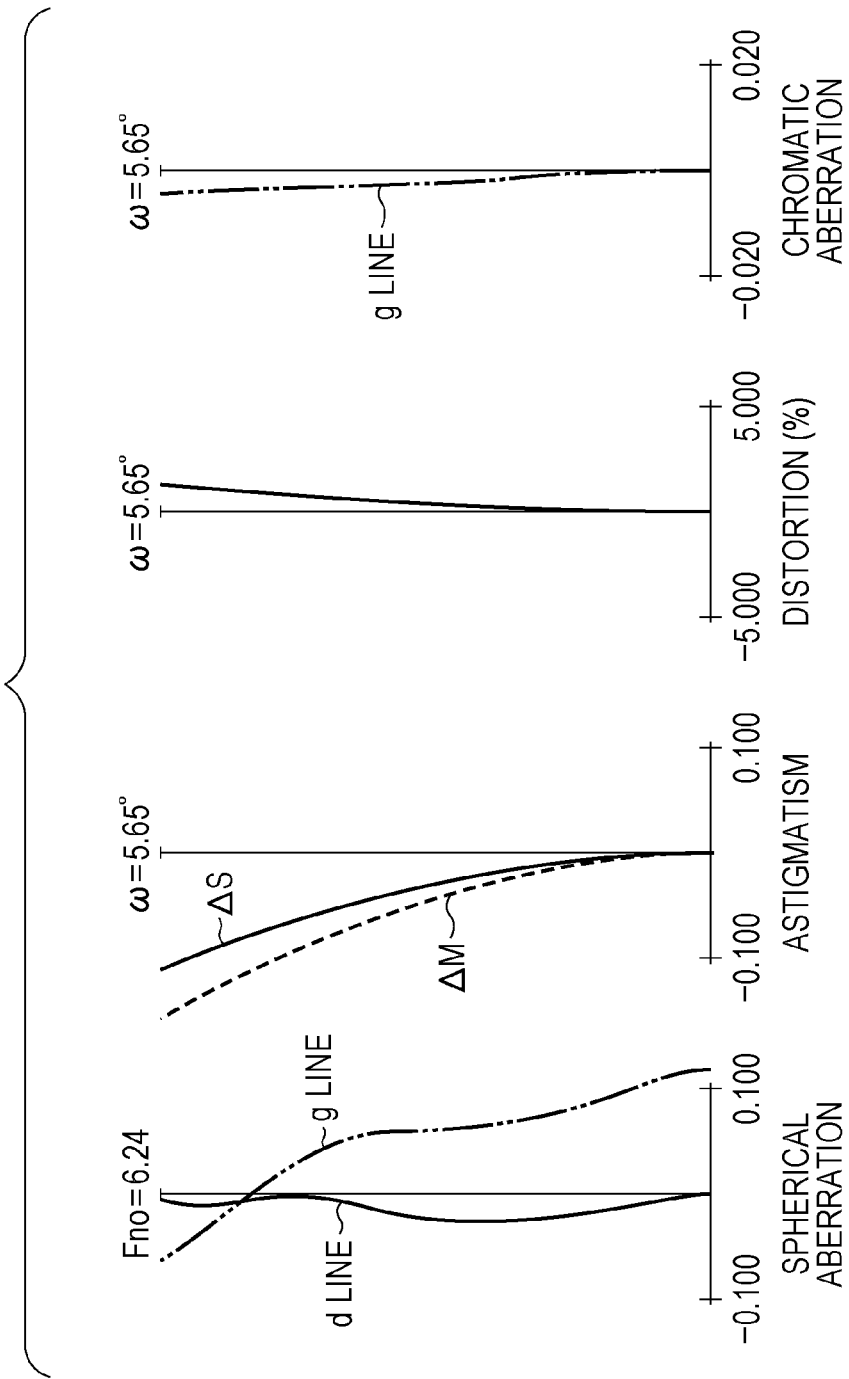

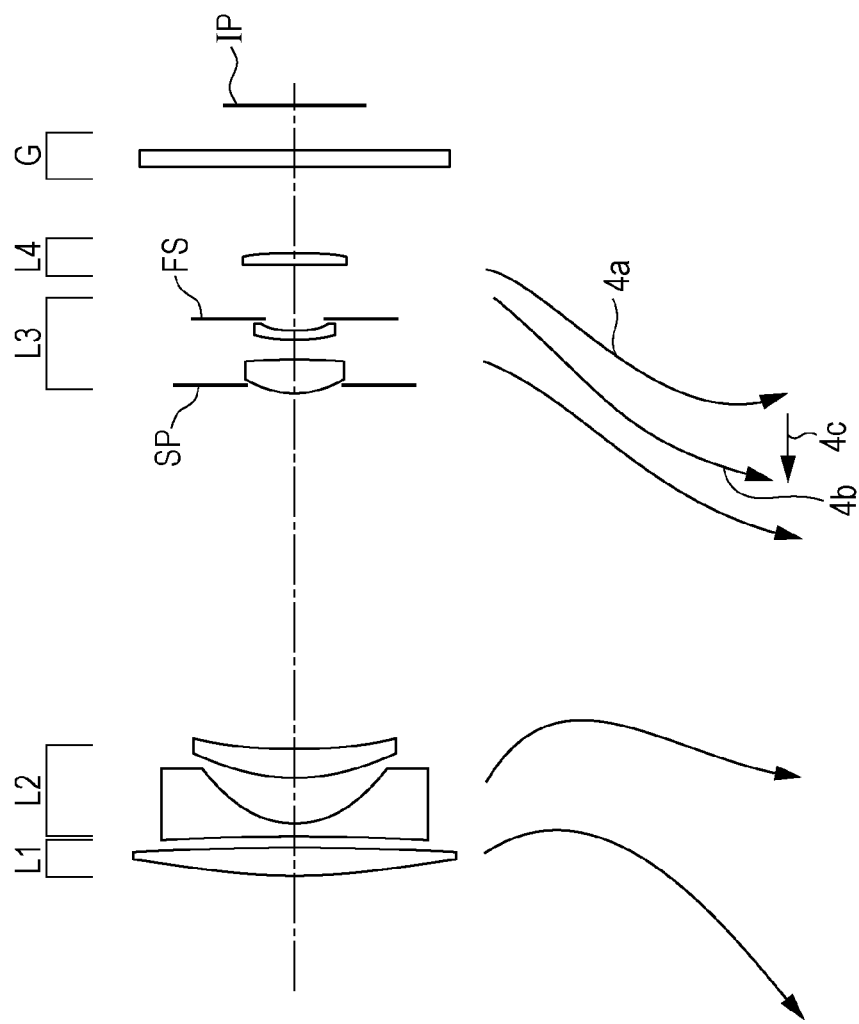

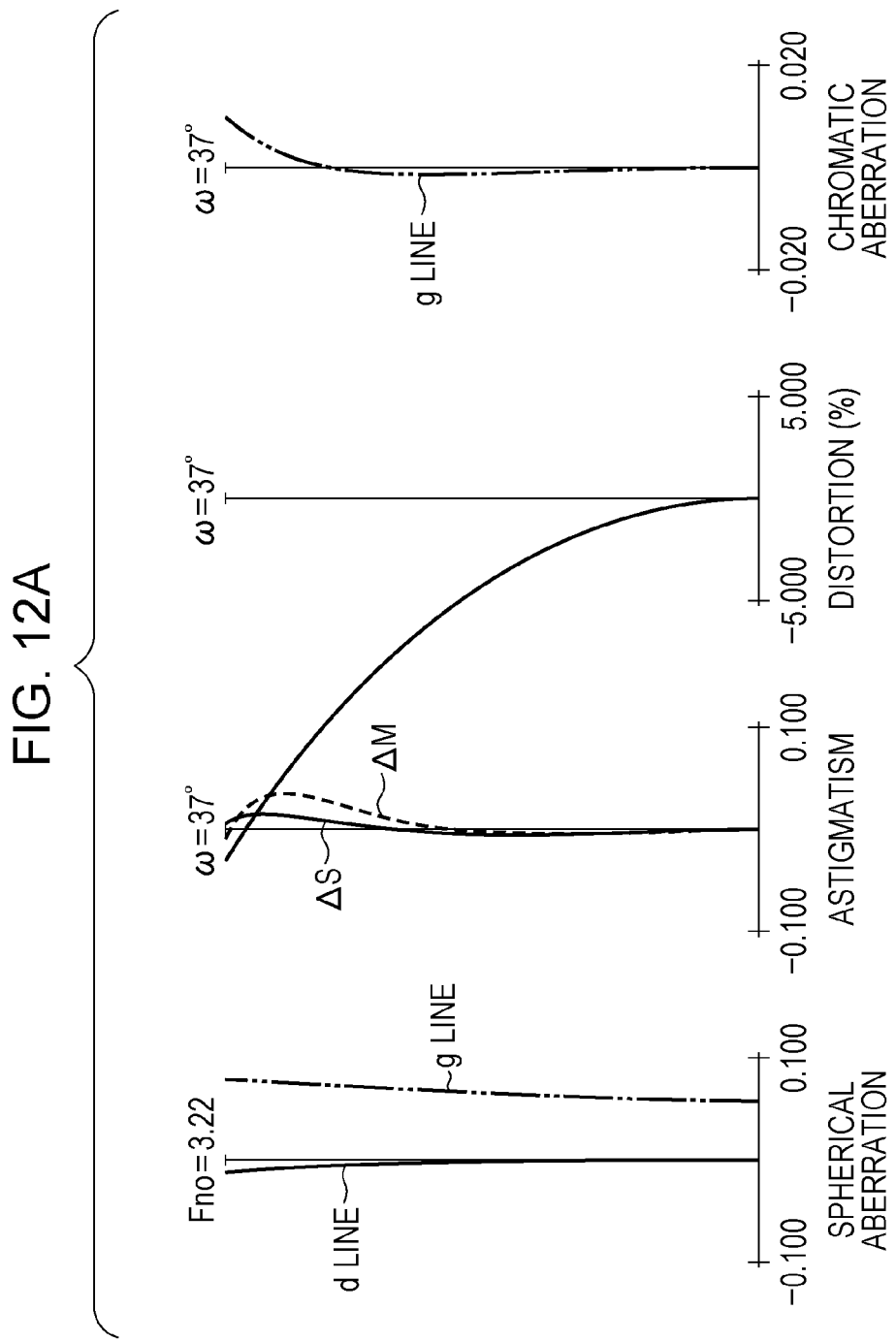

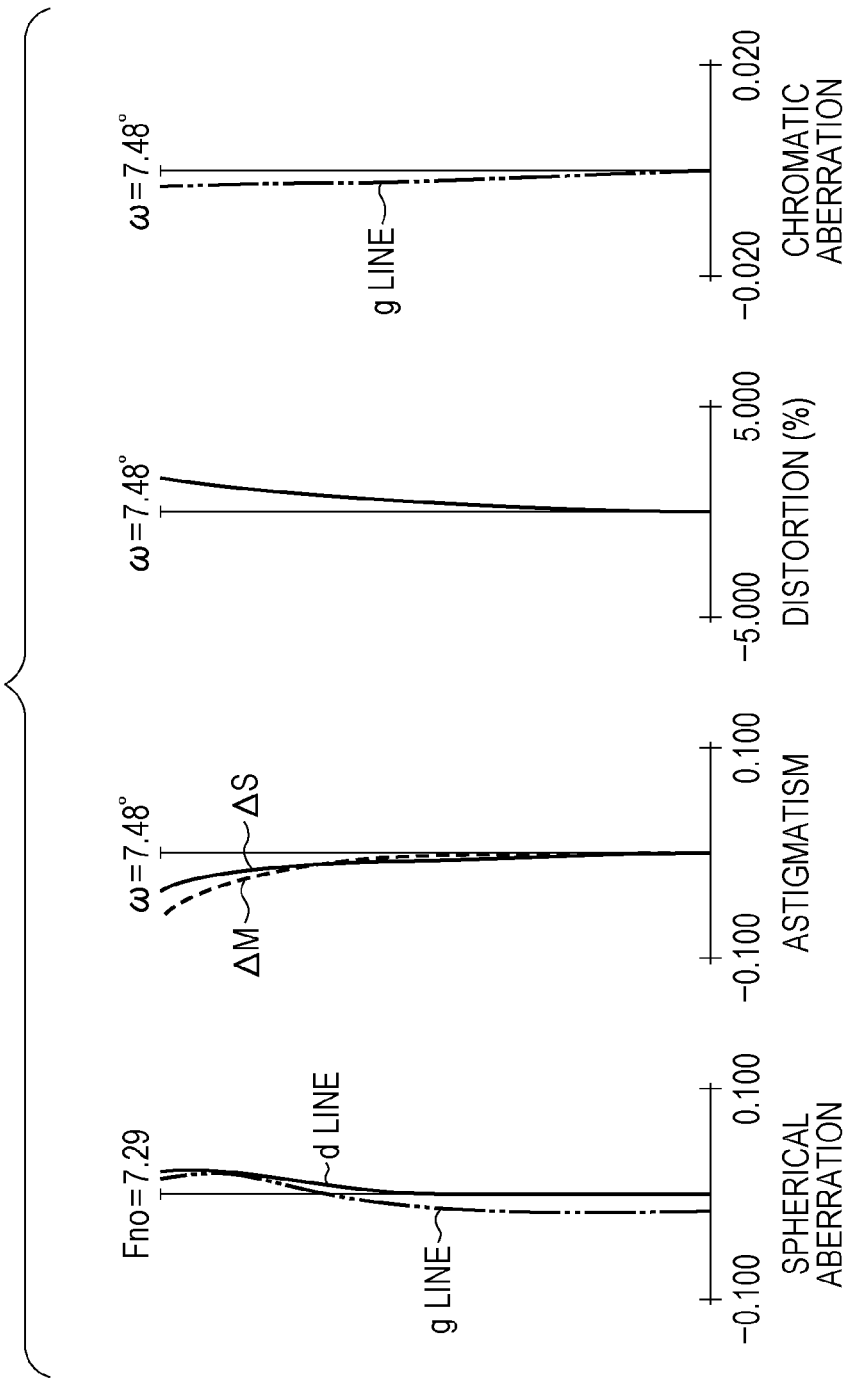

ZOOM LENS AND IMAGE PICKUP APPARATUS INCLUDING THE ZOOM LENS

BACKGROUND OF THE INVENTION

1. Field of the Invention

The present invention relates to a zoom lens and an image pickup apparatus that can use the zoom lens. More specifically, the present invention relates to a zoom lens useful in an image pickup apparatus, such as a video camera, a digital still camera, a television (TV) camera, or a monitoring camera, and to an image pickup apparatus including the zoom lens.

2. Description of the Related Art

A four-unit zoom lens, which is constituted by, in order from the object side to the image side, a first lens unit having a positive refractive power, a second lens unit having a negative refractive power, a third lens unit having a positive refractive power, and a fourth lens unit having a positive refractive power has been known. U.S. Pat. No. 7,830,613 discloses a four-unit zoom lens, whose total size is small, wherein a first lens unit is constituted by a negative lens and a positive lens, and a second lens unit is constituted by negative lens, a negative lens and a positive lens.

Although, U.S. Pat. No. 7,830,613 discloses a zoom lens having a focal length of 28 millimeters (mm), which is the 35 mm equivalent focal length, and a zoom ratio of approximately 6.7, a moving amount the second lens unit is so large that the length of a retractable lens in a retracted state increases. U.S. Pat. No. 7,830,613 also discloses a zoom lens having a focal length of 28 mm, which is the 35 mm equivalent focal length, and a zoom ratio of approximately 4.8. However, the zoom ratio of the zoom lens is not as high as desirable.

In general, a zoom lens that includes lens units each including a larger number of lens elements has a long optical axis for each of the lens units. Moreover, a zoom lens that includes lens units that move large distances during zooming and focusing has a long total length.

In order to reduce the total length of a zoom lens having a predetermined zoom ratio, the refractive power of each lens unit should be increased to thereby decrease the number of lens elements of each lens unit. However, an increase of the refractive power of the lens unit increases changes in aberrations during zooming. Then, it is difficult to compensate for such aberrations in entire zoom range.

In the above-described four-unit zoom lens, in order to simultaneously achieve a compact optical system with a high zoom ratio and good optical performance, it is desirable to appropriately set configurations of lens units, an imaging magnification of the second lens unit, an imaging magnification of the third lens unit, and a refractive power of the second lens unit.

SUMMARY OF THE INVENTION

The present invention provides a small zoom lens having a high zoom ratio and high optical performance over the entire zoom range, and an image pickup apparatus including the zoom lens.

According to an aspect of the present invention, a zoom lens includes a first lens unit having a positive refractive power, a second lens unit having a negative refractive power, a third lens unit having a positive refractive power, and a fourth lens unit having a positive refractive power. The first lens unit, the second lens unit, the third lens unit, and the fourth lens unit are arranged along an optical axis of the zoom lens in order from the object side to the image side. All of the lens units are moved along the optical axis from the wide-angle end to the telephoto end to perform zooming. The first lens unit includes not more than two lenses. The second lens unit includes not more than three lenses including a positive lens and a negative lens. The third lens unit consists of two lenses. The fourth lens unit consists of a single lens. The following conditions are satisfied:

$$1.0 < (\beta 3t/\beta 3w)/(\beta 2t/\beta 2w);$$

$$T12/ft < 0.30;$$

$$0.8 < |f2|/fw < 5.0,$$

where $\beta 3t$ and $\beta 3w$ are imaging magnifications on the telephoto end and the wide-angle end of the third lens unit, $\beta 2t$ and $\beta 2w$ are imaging magnifications on the telephoto end and the wide-angle end of the second lens unit, T12 is a sum of thicknesses on the optical axis of the first lens unit and the second lens unit, and ft and fw are focal lengths at the telephoto end and the wide-angle end of the entire zoom lens.

Further features and aspects of the present invention will become apparent to persons having ordinary skill in the art from the following detailed description of exemplary embodiments with reference to the attached drawings.

BRIEF DESCRIPTION OF THE DRAWINGS

FIG. 1 is a sectional view of a zoom lens according to a first numerical example of the present invention at the wide-angle end.

FIGS. 2A to 2C illustrate aberration diagrams of the zoom lens according to the first numerical example of the present invention.

FIG. 3 is a sectional view of a zoom lens according to a second numerical example of the present invention at the wide-angle end.

FIGS. 4A to 4C illustrate aberration diagrams of the zoom lens according to the second numerical example of the present invention.

FIG. 5 is a sectional view of a zoom lens according to a third numerical example of the present invention at the wide-angle end.

FIGS. 6A to 6C illustrate aberration diagrams of the zoom lens according to the third numerical example of the present invention.

FIG. 7 is a sectional view of a zoom lens according to a fourth numerical example of the present invention at the wide-angle end.

FIGS. 8A to 8C illustrate aberration diagrams of the zoom lens according to the fourth numerical example of the present invention.

FIG. 11 is a sectional view of a zoom lens according to a sixth numerical example of the present invention at the wide-angle end.

FIGS. 12A to 12C illustrate aberration diagrams of the zoom lens according to the sixth numerical example of the present invention.

DESCRIPTION OF THE EMBODIMENTS

A zoom lens according to an exemplary embodiment of the present invention includes a first lens unit having a positive refractive power, a second lens unit having a negative refractive power, a third lens unit having a positive refractive power, and a fourth lens unit having a positive refractive power, which are arranged in order from an object side toward an image side. During zooming, all of the lens units move. In the following description, a plane where an object to be imaged is located will be referred to as an "object plane", and a plane where an image of the object is formed will be referred to as an "image plane". When considering an entire image pickup apparatus that includes a zoom lens and an image pickup element, the image plane corresponds to a plane located at the back focal plane of the zoom lens. Incidentally, the side of a lens where the object to be imaged is placed is interchangeably referred to as the "object-plane side", "object side", or "front side" of the lens; and the side of the lens where the image is formed is interchangeably referred to as the "image-plane side", "image side" or "back side" of the lens.

Figure 2C:
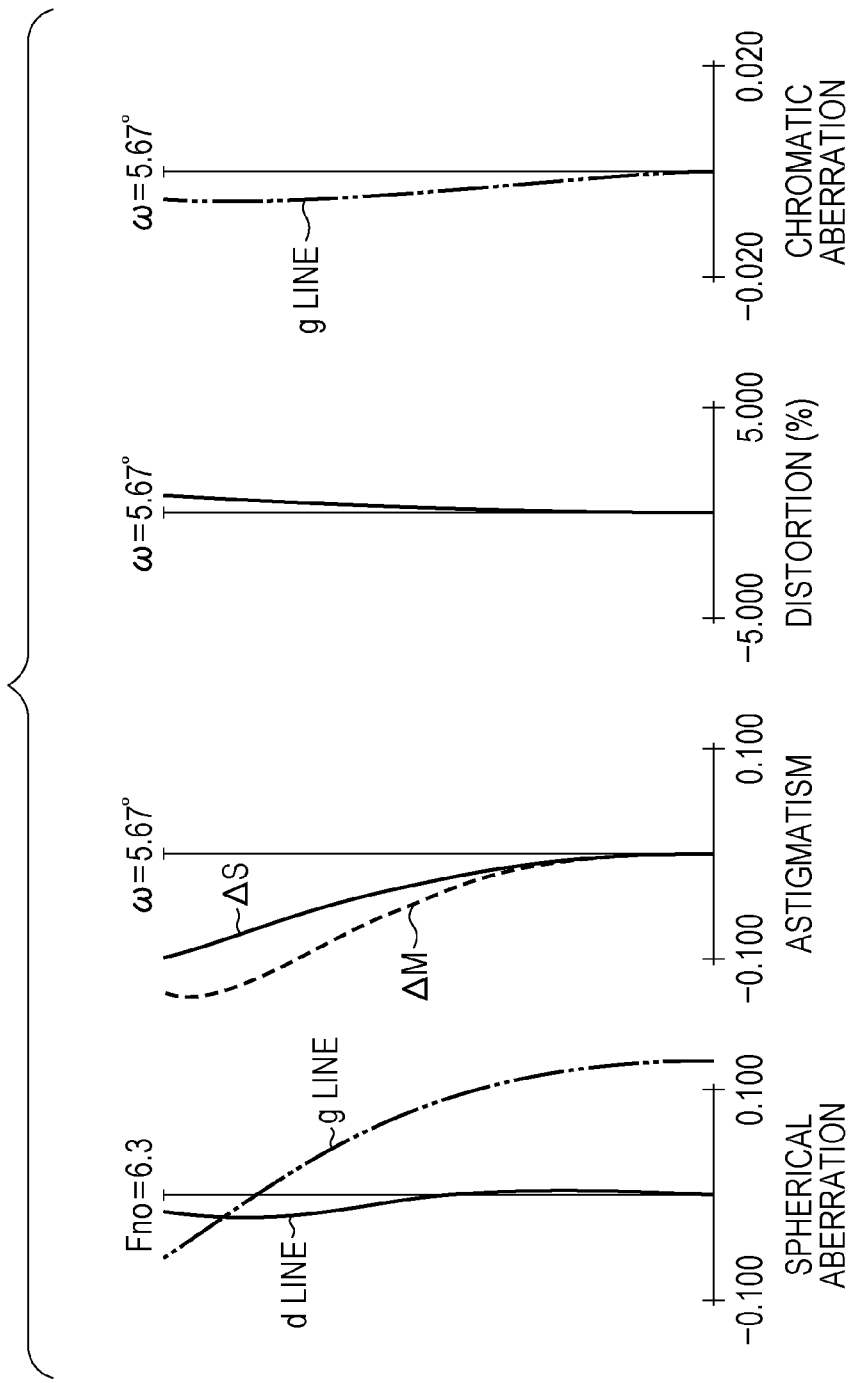

FIG. 1 is a lens cross section of a zoom lens according to a first exemplary embodiment of the present invention at the wide-angle end (short focal length end). FIGS. 2A, 2B, and 2C are aberration charts of the zoom lens at the wide-angle end, at the middle focal length, and at the telephoto end (long focal length end), respectively, according to the first exemplary embodiment. In a zoom lens according to a first exemplary embodiment, the zoom ratio is 7.61 and F-number is about 3.33 to 6.30.

Figure 4A:
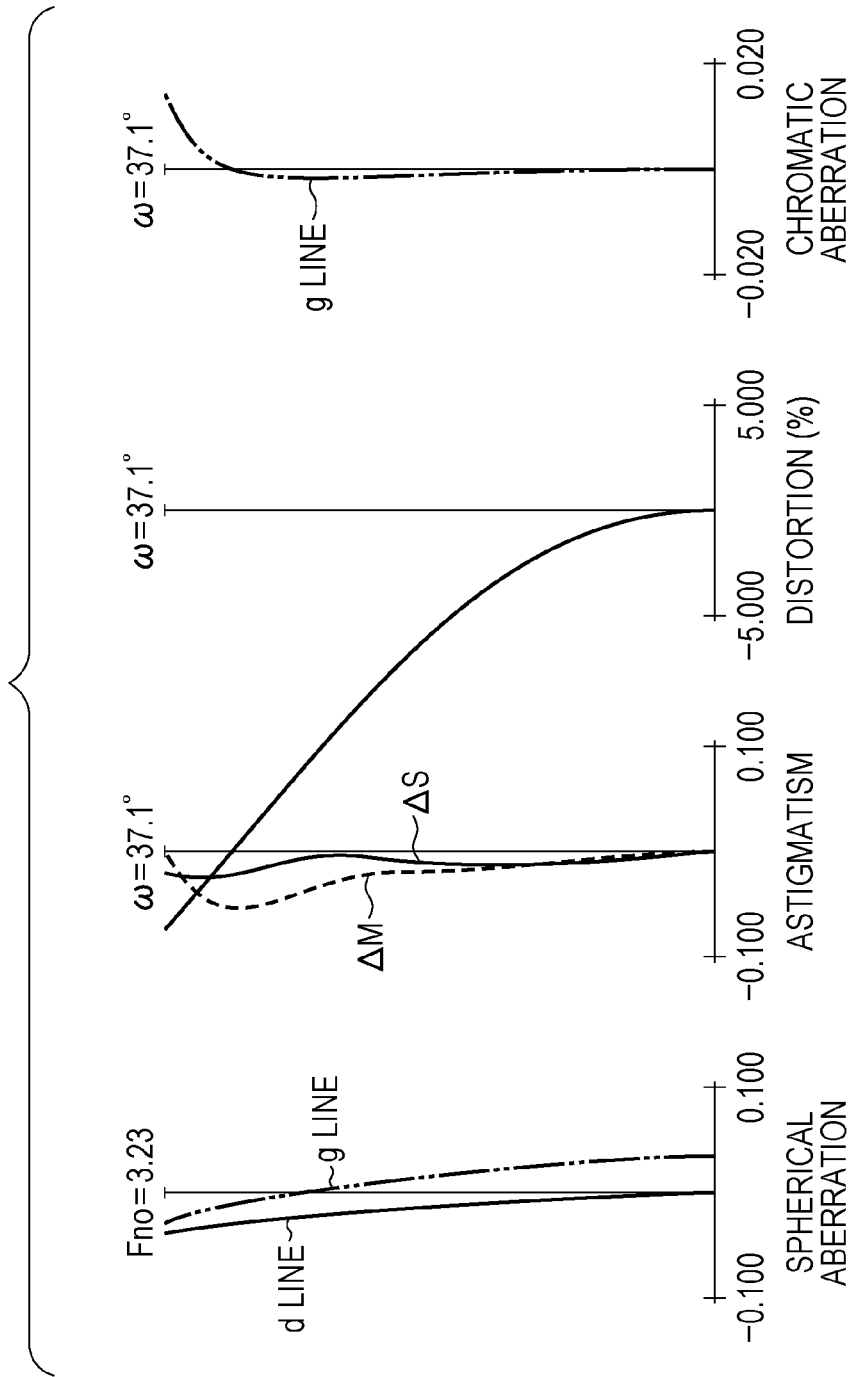

FIG. 3 is a lens cross section of a zoom lens according to a second exemplary embodiment of the present invention at the wide-angle end. FIGS. 4A, 4B, and 4C are aberration charts of the zoom lens at the wide-angle end, at the middle focal length, and at the telephoto end, respectively, according to the second exemplary embodiment. In a zoom lens according to a second exemplary embodiment, the zoom ratio is 7.73 and F-number is about 3.23 to 6.08.

FIG. 5 is a lens cross section of a zoom lens according to a third exemplary embodiment of the present invention at the wide-angle end. FIGS. 6A, 6B, and 6C are aberration charts of the zoom lens at the wide-angle end, at the middle focal length, and at the telephoto end, respectively, according to the third exemplary embodiment. In a zoom lens according to a third exemplary embodiment, the zoom ratio is 9.49 and F-number is about 2.97 to 6.08.

Figure 8B:
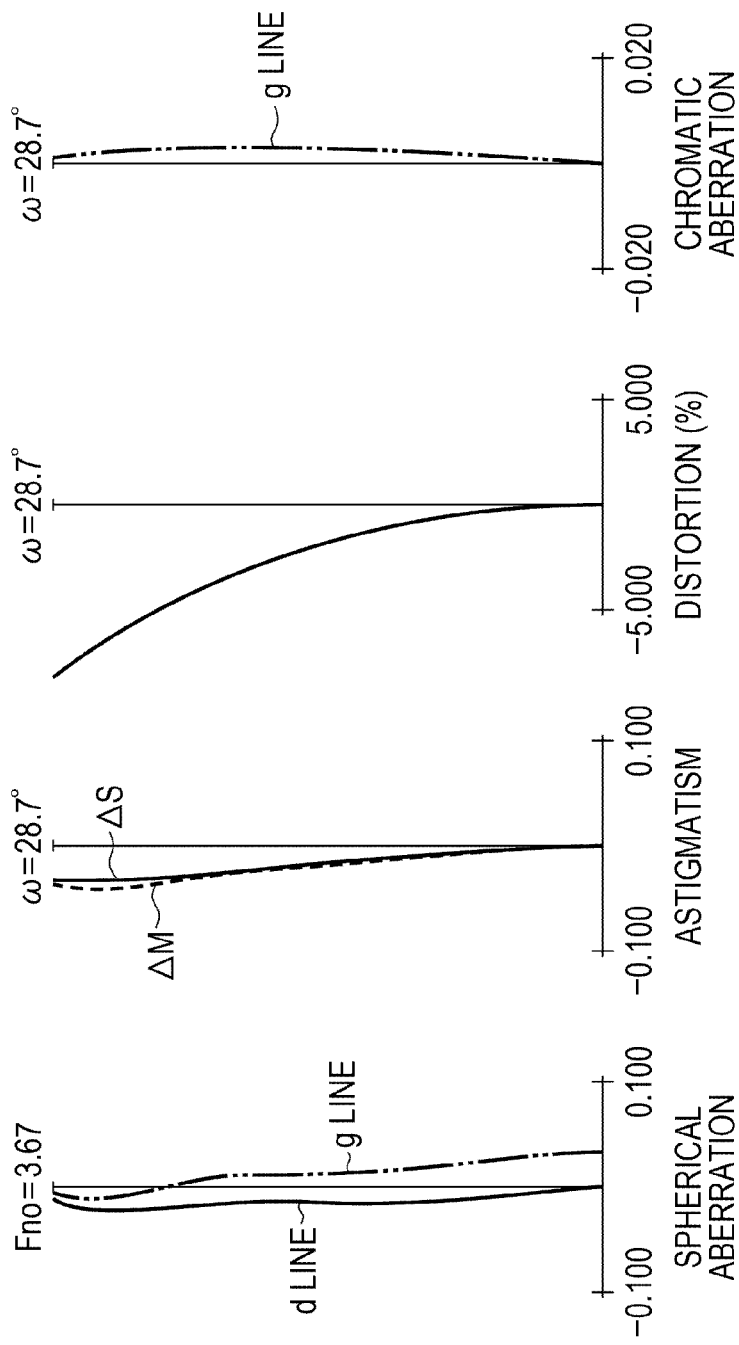

FIG. 7 is a lens cross section of a zoom lens according to a fourth exemplary embodiment of the present invention at the wide-angle end. FIGS. 8A, 8B, and 8C are aberration charts of the zoom lens at the wide-angle end, at the middle focal length, and at the telephoto end, respectively, according to the fourth exemplary embodiment. In a zoom lens according to a fourth exemplary embodiment, the zoom ratio is 7.64 and F-number is about 3.51 to 6.24.

Figure 9:
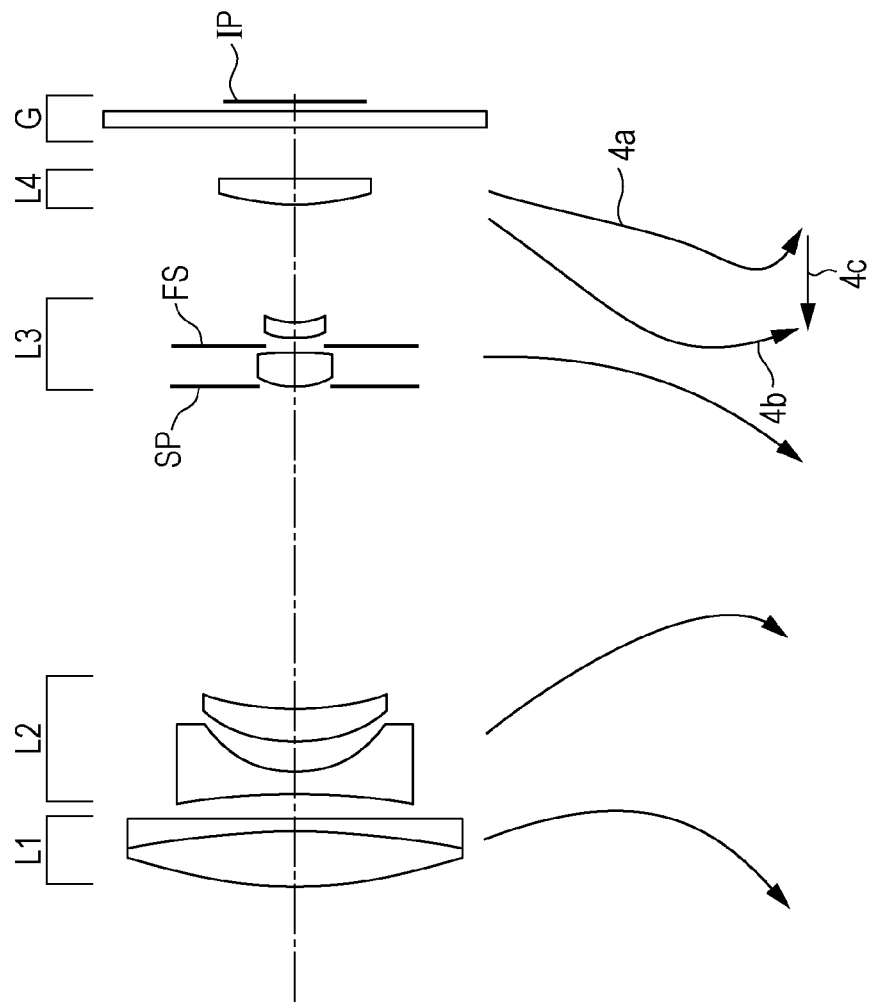
FIG. 9 is a sectional view of a zoom lens according to a fifth numerical example of the present invention at the wide-angle end.
Figure 10A:
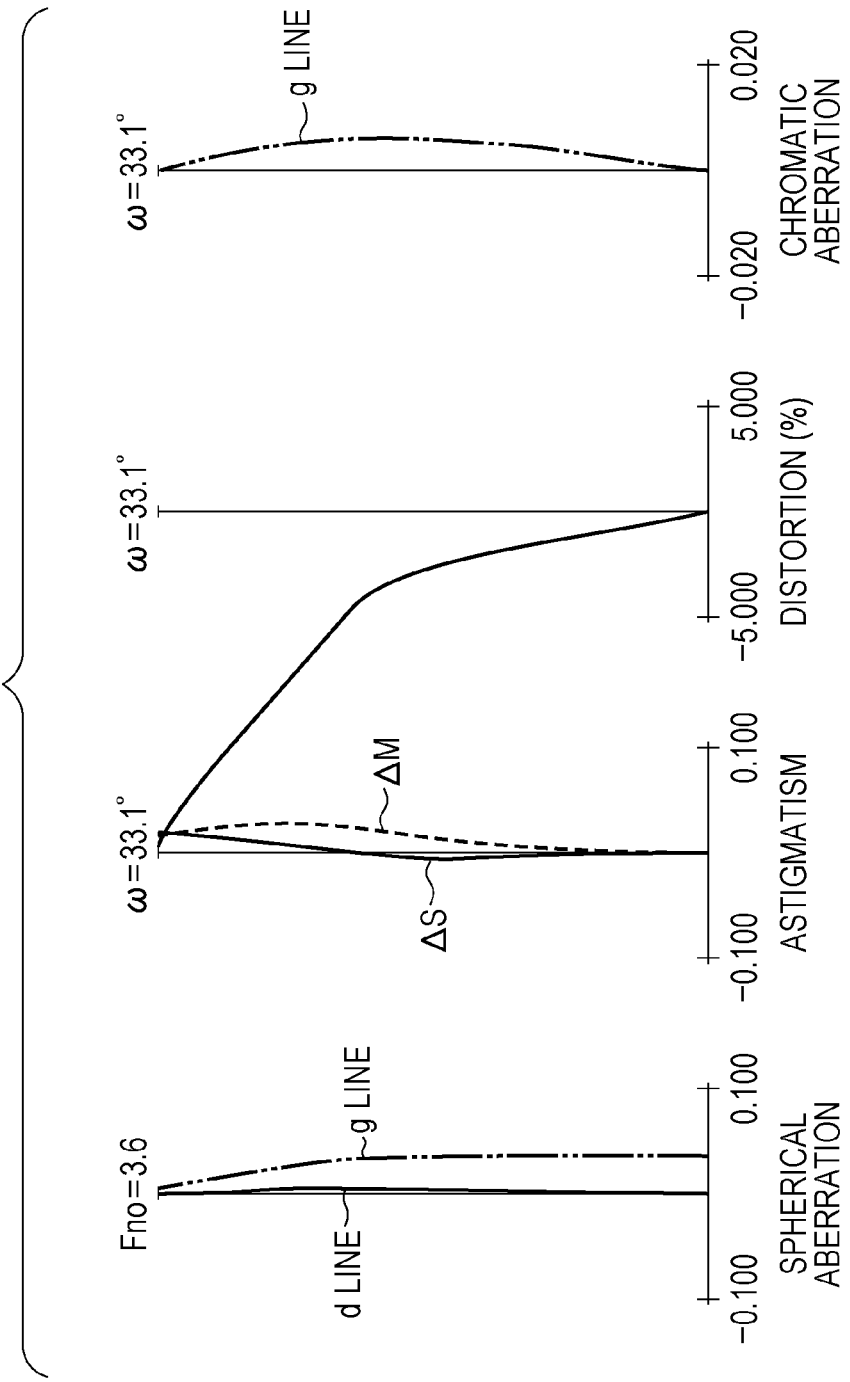
FIGS. 10A to 10C illustrate aberration diagrams of the zoom lens according to the fifth numerical example of the present invention.
Figure 10B:
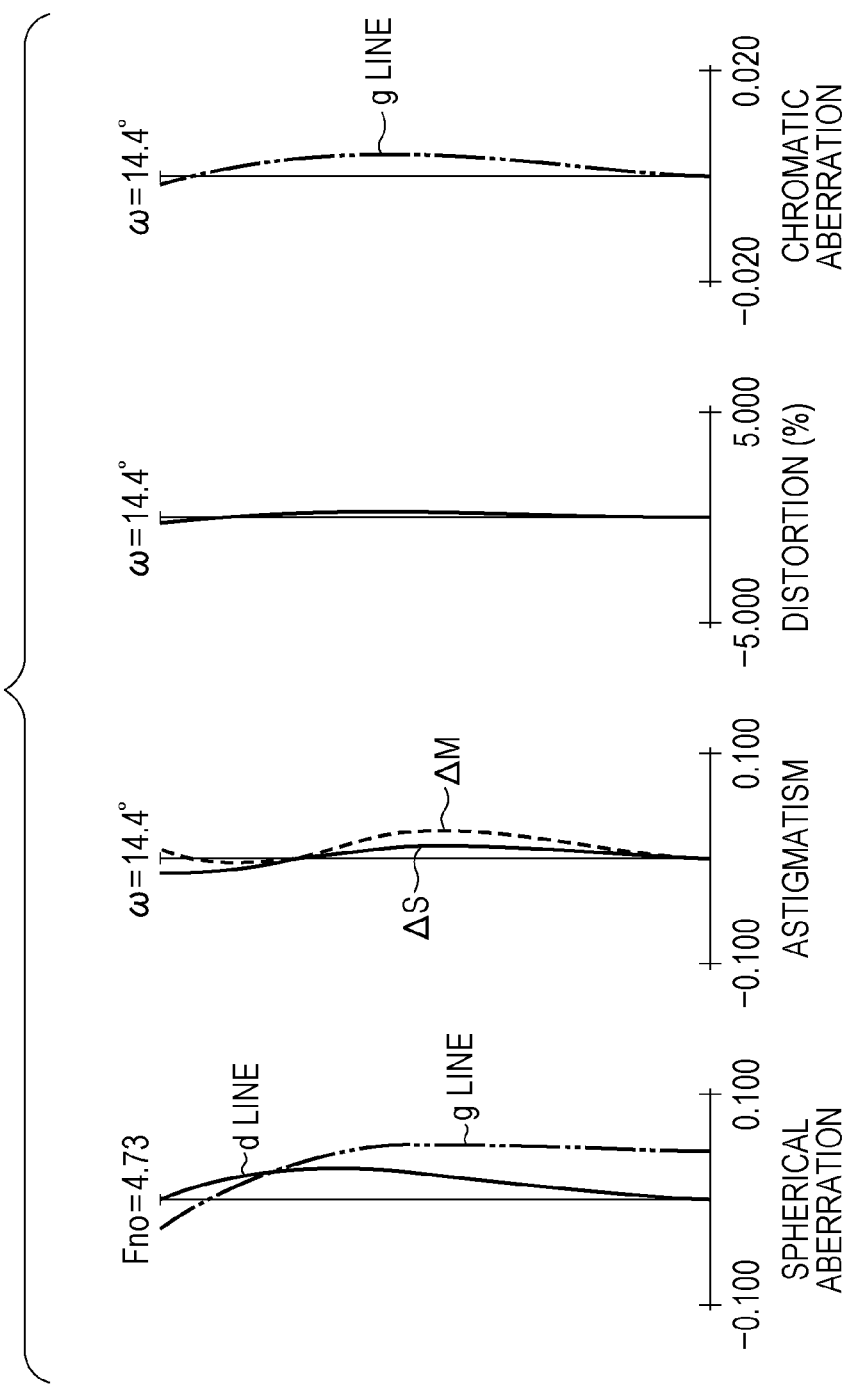
Figure 10C:
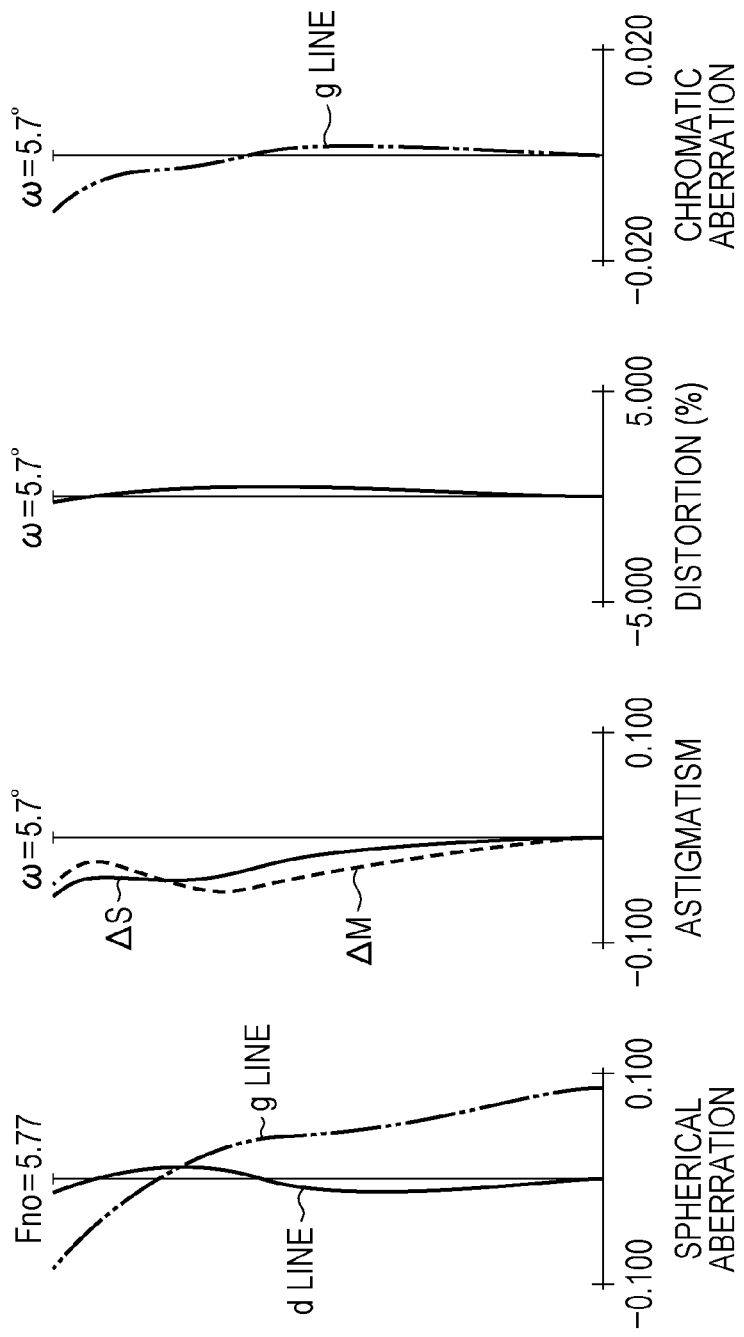

FIG. 9 is a lens cross section of a zoom lens according to a fifth exemplary embodiment of the present invention at the wide-angle end. FIGS. 10A, 10B, and 10C are aberration charts of the zoom lens at the wide-angle end, at the middle focal length, and at the telephoto end, respectively, according to the fifth exemplary embodiment. In a zoom lens according to a fifth exemplary embodiment, the zoom ratio is 7.58 and F-number is about 3.60 to 5.77.

Figure 12B:
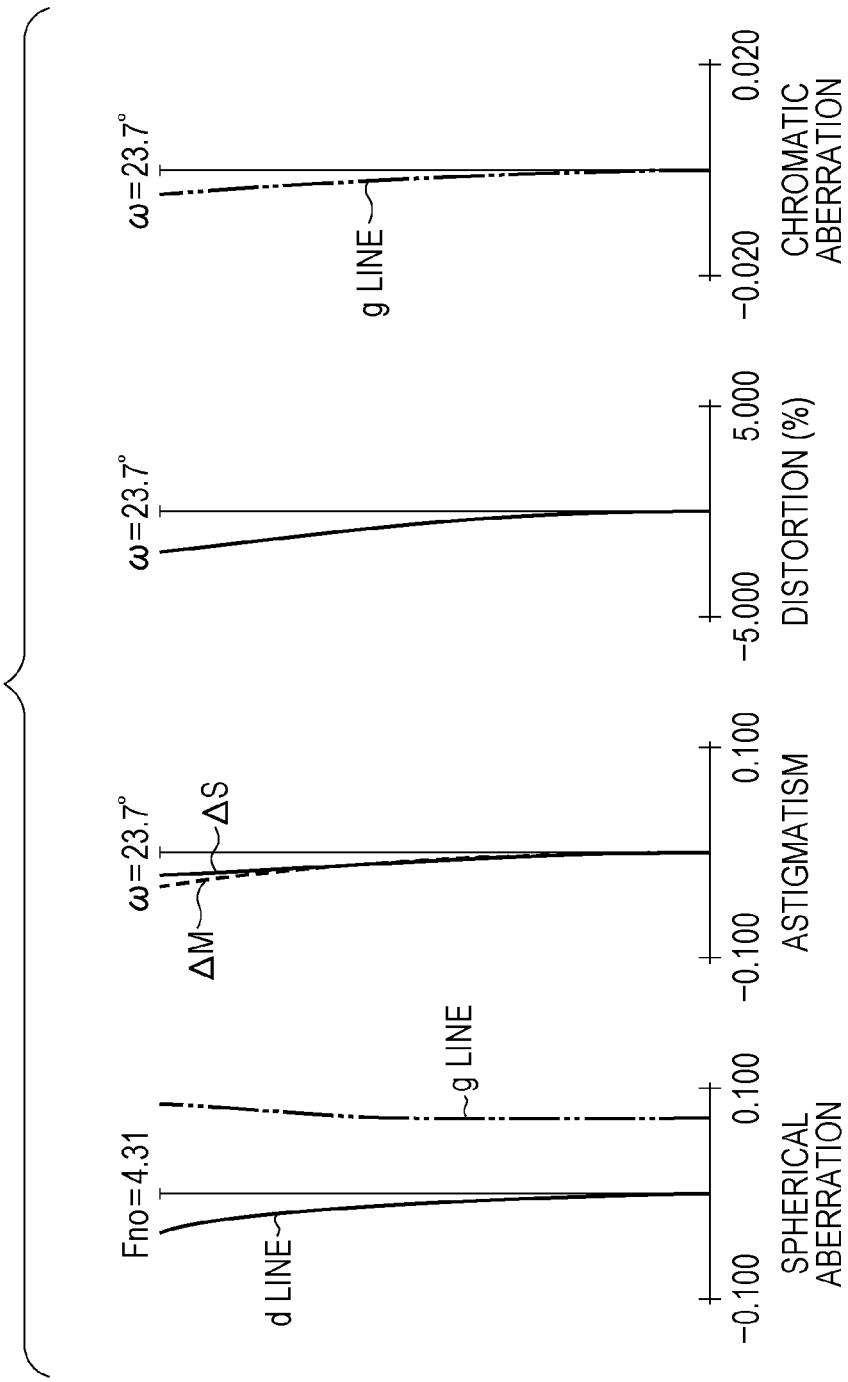

FIG. 11 is a lens cross section of a zoom lens according to a sixth exemplary embodiment of the present invention at the wide-angle end. FIGS. 12A, 12B, and 12C are aberration charts of the zoom lens at the wide-angle end, at the middle focal length, and at the telephoto end, respectively, according to the sixth exemplary embodiment. In a zoom lens according to a sixth exemplary embodiment, the zoom ratio is 6.68 and F-number is about 3.22 to 7.29.

Figure 13:
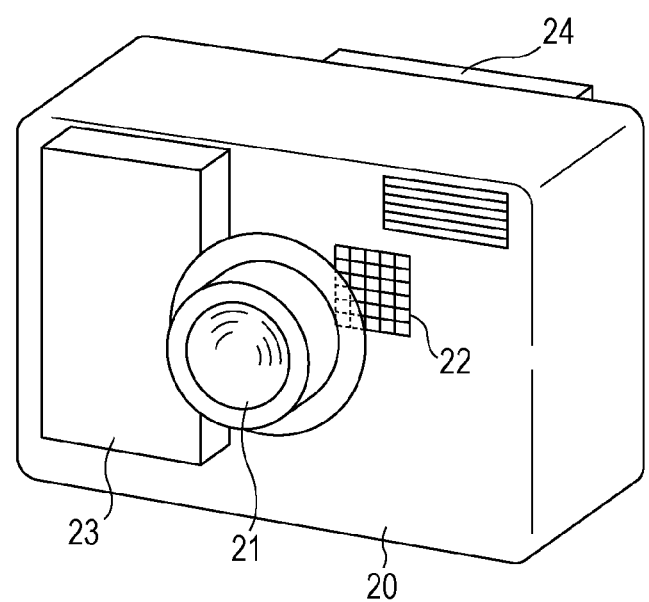
FIG. 13 is a schematic diagram illustrating the main part of an image-pickup apparatus according to an embodiment of a present invention.

FIG. 13 illustrates relevant components of a camera (an example of an image pickup apparatus) including a zoom lens according to an exemplary embodiment of the present invention.

The zoom lens according to each exemplary embodiment is an photographic lens used for an image pickup apparatus such as a video camera, a digital camera, or a silver-halide film camera. In the lens cross sectional views of FIGS. 1, 3, 5, 7, 9, and 11, the left is the object side (front side) and the right is the image side (rear side). In the lens cross sectional views of FIGS. 1, 3, 5, 7, 9, and 11, reference symbol "i" denotes a lens unit order counted from the object side and reference symbol Li denotes an i-th lens unit.

In each of the lens cross sections of the zoom lens according to the first through the sixth exemplary embodiments, "L1" denotes a first lens unit L1 having a positive refractive power (optical power=an inverse of the focal length), "L2" denotes a second lens unit L2 having a negative refractive power, "L3" denotes a third lens unit L3 having a positive refractive power, and "L4" denotes a fourth lens unit having a positive refractive power.

"SP" denotes an aperture stop. In each of the zoom lens according the second, the third and the fifth exemplary embodiment, the aperture stop SP is located on the object side of the third lens unit L3. In each of the zoom lens according the first, the fourth and the sixth exemplary embodiment, the aperture stop SP is provided between the object-side vertex of the positive lens, which is located at the most object side of the third lens unit L3, and an intersection of the object-side lens surface of the positive lens and an outer peripheral portion of the positive lens. Flare-cut stop FP having a fixed aperture diameter is disposed on the image plane side or the object plane side of the third lens unit L3. An optical block G corresponds to an optical filter, a face plate, a crystal low-pass filter, or an infrared cut-off filter. An image plane IP corresponds to an image pickup surface of a solid-state image pickup element (photoelectric conversion element), such as a CCD (charge coupled device) sensor or a CMOS (complementary metal oxide semiconductor) sensor, when the zoom lens is used as an imaging optical system of a video camera or a digital still camera. The image plane IP may also represent a position of the film when the zoom lens is used in a silver-halide film camera.

In the aberration diagrams, d and g respectively represent a d-line and a g-line of the Fraunhofer spectrum, and ΔM and ΔS respectively represent a meridional image plane and a sagittal image plane. Lateral chromatic aberration is represented by the g-line, ω represents the half angle of view (half of the imaging angle of view), and Fno represents the f-number.

In the following embodiments, the wide angle end and the telephoto end refer to zoom positions provided when the lens unit (L2, L3) for zooming is positioned at opposite ends of a mechanical movable range on the optical axis. In the embodiments, the lens units move during zooming from the wide angle end to the telephoto end, as shown by arrows in the figures.

During zooming from the wide angle end to the telephoto end, the respective lens units are moved to change respective lens unit distances as follows. A distance between the first lens unit L1 and the second lens unit L2 at the telephoto end becomes larger than that at the wide angle end. A distance between the second lens unit L2 and the third lens unit L3 at the telephoto end becomes smaller than that at the wide angle end. A distance between the third lens unit L3 and the fourth lens unit L4 at the telephoto end becomes smaller than that at the wide angle end.

Specifically, the first lens unit L1 and the second lens unit L2 move along a locus convex to the image side, the third lens unit L3 moves to the object side on the optical axis and the fourth lens unit L4 moves along a locus convex to the object side.

The fourth lens unit L4 is moved on an optical axis for focusing. Specifically, the fourth lens unit L4 is moved to the object plane side, as indicated by the arrow 4c, during focusing from an infinite to a short distance at the telephoto end. Curve lines 4a and 4b are moving loci in focus on an object at infinity and at a short distance, respectively. In each of the exemplary embodiments, the fourth lens unit L4, which is small and light, is moved for focusing. In each of the exemplary embodiments, the fourth lens unit L4 which is small in size and light in weight is moved for focusing, thereby achieving speedy focusing. For example, speedy auto-focusing is facilitated.

In the following exemplary embodiments, the first lens unit L1 is constituted by not more than two lenses. The second lens unit L2 is constituted by not more than three lenses including a positive lens and a negative lens. The third lens unit L3 is constituted by two lenses. The fourth lens unit L4 is constituted by a single lens. The following conditions are satisfied:

$$1.0 < (\beta 3t/(\beta 3w))/(\beta 2t/(\beta 2w)) \tag{1}$$

$$T12/ft < 0.30 \tag{2}$$

$$0.8 < |f2|/fw < 5.0 \tag{3}$$

where β3t and β3w are imaging magnifications on the telephoto end and the wide-angle end of the third lens unit, β2t and β2w are imaging magnifications on the telephoto end and the wide-angle end of the second lens unit, T12 is a sum of thicknesses on the optical axis of the first lens unit and the second lens unit, and ft and fw are focal lengths of an entire lens system on the telephoto end and the wide-angle end.

In the following embodiments, a distance between the first lens unit L1 and the second lens unit L2 is increased during zooming. The third lens unit L3 is moved to vary an entrance pupil position at a telephoto end. Accordingly, the total size of the zoom lens can be reduced. In addition, a moving amount of the first lens unit L1 and a moving amount of a second lens unit L2 can be reduced because a share of magnification variation of the second lens unit L2 can be reduced by moving the third lens unit L3 during zooming. Therefore, a zoom lens having a high zoom ratio and a short total lens length at the telephoto end can be available. Furthermore, each focal length of the first lens unit L1 and the second lens unit L2 can be increased by moving the third lens unit L3 during zooming, to shorten each effective diameter of the first lens unit L1 and the second lens unit L2. Therefore, thicknesses of the first lens unit L1 and the second lens unit L2 can be thin. As a result, the length of a retractable zoom lens in retracted state can be shortened.

The first lens unit L1 is moved along a locus convex toward the image plane side during zooming from the wide-angle end to the telephoto end so that the entrance pupil is located at a position closer to the object plane at a zoom position that is the wide angle end or slightly close to the telephoto end from the wide angle end, where an effective diameter of the front lens is available during zooming. Thereby, an effective diameter of the front lens can be shortened and a sharp decline of light amount at a peripheral portion of the image can be improved.

The condition (1) relates to the share of magnification variation between the second lens unit L2 and the third lens unit L3. When a value is lower than the lower limit value of the condition (1), the share of magnification variation of the third lens unit L3 decreases. Accordingly the share of magnification variation of the second lens unit must be increased to achieve a high zoom ratio. As a result, moment amount of the second lens unit L2 becomes so large that it becomes difficult to reduce the total size of the zoom lens.

The condition (2) specifies a relationship between the sum of thicknesses of the first lens unit L1 and the second lens unit L2 and a focal length of the entire zoom lens at the telephoto end. When a value exceeds the upper limit value of the condition (2), the thicknesses of the first lens unit L1 and the second lens unit L2 increase. Accordingly, a total lens length of a retracted zoom lens increases.

The condition (3) relates to a focal length of the second lens unit L2 and a focal length of the entire zoom lens at the wide-angle end. When a value exceeds the upper limit value of the condition (3), a focal length of the second lens unit L2 increases. Therefore, moving amounts of the first lens unit L1 and the second lens unit L2 increase, a total lens length of the zoom lens at the telephoto end increases. When a value is lower than the lower limit value of the condition (3), a focal length of the second lens unit L2 decreases. As a result, a Petzval sum increases in the negative direction, and a field curvature increases.

For the conditional expressions (1) to (3), it is more preferable to satisfy the following numerical ranges.

$$1.0 < (\beta 3t/(\beta 3w))/(\beta 2t/(\beta 2w)) < 14.0 \tag{1a}$$

$$0.05 < T12/ft < 0.25 \tag{2a}$$

$$1.2 < |f2|/fw < 3.0 \tag{3a}$$

When a value exceeds the upper limit value of the condition (1a), a share of magnification variation of the third lens unit L3 becomes so large that a refractive power of the third lens unit L3 is needed to be increased. In this case, curvature radii of the lens surfaces constituting the third lens unit L3 become so small that it becomes difficult to correct coma in the entire zoom range.

When a value is lower than the lower limit value of the condition (2a), thicknesses of the first lens unit L1 and the second lens unit L2 become small. Accordingly, a longitudinal chromatic aberration at the telephoto end and a lateral chromatic aberration at the wide-angle end become large. As a result, it becomes difficult to achieve a good optical performance by correcting aberrations described above by the third lens unit L3 and the fourth lens unit L4.

For the conditional expressions (1) to (3), it is more preferable to satisfy the following numerical ranges.

$$1.0 < (\beta 3t/(\beta 3w))/(\beta 2t/(\beta 2w)) < 12.0 \tag{1b}$$

$$0.10 < T12/ft < 0.25 \tag{2b}$$

$$1.4 < |f2|/fw < 2.5 \tag{3b}$$

The lens units according to each embodiment have a simple and compact configuration, have a large zoom ratio of approximately 8 to 10, and achieve excellent optical performance in all zoom ranges. Furthermore, the lens units included in the zoom lens system each have a small number of lens elements and can be retracted into a small space.

According to the present invention, it is more desirable to satisfy at least one of the following conditions:

$$1.80 < N2d\_ave < 2.40 \quad (4)$$

$$4.0 < f1/fw \quad (5)$$

$$1.80 < f3/fw < 3.00 \quad (6)$$

$$3.5 < f1p/fw < 20.00 \quad (7)$$

$$0.80 < f3p/fw < 20.00 \quad (8)$$

where N2d_ave is an average value of refractive indices of materials of lenses constituting the second lens unit with respect to d-line light, f1 is a focal length of the first lens unit, f3 is a focal length of the third lens unit, ftp is a focal length of a positive lens constituting the first lens unit, f3p is a focal length of a positive lens constituting the third lens unit.

The condition (4) relates to refractive indices of materials of lenses of the second lens unit L2. When the condition (4) is satisfied, it is possible to achieve a zoom lens having a short length in retracted state and high optical performance.

When a value is lower than the lower limit value of the condition (4), curvatures of lens surfaces included in the second lens unit L2 become so large that high-order aberration of the lens surfaces included in the second lens unit L2 increase, which is difficult to be corrected.

When a value exceeds the upper limit value of the condition (4), in other words, when an average of refractive indices of materials of lenses of the second lens unit exceeds the higher limit of condition (4), an effect of correcting Petzval sum toward a minus direction decreases. Accordingly, curvature of field undesirably increases toward under-corrected side.

For the conditional expression (4), it is more preferable to satisfy the following numerical range.

$$1.80 < N2d\_ave < 2.20 \quad (4a)$$

The condition (5) relates to a focal length of the first lens unit L1. When the condition (5) is satisfied, it is possible to keep a balance between a compactness of a zoom lens and high optical performance.

When a value is lower than the lower limit value of the condition (5), a refractive power of the first lens unit L1 becomes so large that spherical aberration and axial chromatic aberration become large. Accordingly, it is difficult to achieve high optical performance.

For the conditional expression (5), it is more preferable to satisfy the following numerical range.

$$4.0 < f1/fw < 20.0 \quad (5a)$$

When a value exceeds the upper limit value of the condition (5a), a refractive power of the first lens unit L1 becomes so small that relative moving amount of the first lens unit L1 and the second lens unit L2 increases in order to realize a specific zoom ratio. Accordingly, an overall lens length of the zoom lens and an effective diameter of the front lens becomes undesirably long. It is more preferable to satisfy the following numerical range.

$$6.0 < f1/fw < 18.0 \quad (5b)$$

The condition (6) relates to a focal length of the third lens unit L3. When the condition (6) is satisfied, it is possible to preferably correct spherical aberration and coma, and to achieve a zoom lens having a wide angle of view.

When a value exceeds the upper limit value of the condition (6), moving amount of the third lens unit L3 becomes so long that it becomes difficult to realize a shortened overall lens length and high zoom ratio.

When a value is lower than the lower limit value of the condition (6), a refractive power of the third lens unit L3 becomes so large that it becomes difficult to correct spherical aberration and coma, while it becomes easy to realize a wide angle of view. It is more preferable to satisfy the following numerical range.

$$2.00 < f3/fw < 2.60 \quad (6a)$$

The condition (7) relates to a focal length of the positive lens, which constitutes the first lens unit L1.

When a value is lower than the lower limit value of the condition (7), the refractive power of the positive lens becomes so large that Petzval sum increases in a positive direction. Accordingly, it becomes difficult to correct curvature of field.

When a value exceeds the upper limit value of the condition (7), the refractive power of the positive lens becomes so small that an overall lens length of the zoom lens and an effective diameter of the front lens becomes undesirably long. Accordingly, the length of a zoom lens in retracted state increases. It is more preferable to satisfy the following numerical range.

$$4.00 < f1p/fw < 17.00 \quad (7a)$$

The condition (8) relates to a focal length of the positive lens, which constitutes the third lens unit L3.

When a value exceeds the upper limit value of the condition (8), the refractive power of the positive lens becomes so small that a refractive power of the third lens unit L3 becomes small. Accordingly, movement amount of the third lens unit L3 must be increased to achieve a specific zoom ratio. Then, an effective diameter the third lens unit L3 and a thickness of the third lens unit L3 on the optical axis increase. As a result, the length of a zoom lens in retracted state increases.

When a value is lower than the lower limit value of the condition (8), a spherical aberration increases. Accordingly, it becomes difficult to achieve high optical performance. It is more preferable to satisfy the following numerical range.

$$1.00 < f3p/fw < 1.80 \quad (8a)$$

It is more preferable to satisfy the following numerical range.

$$1.20 < f3p/fw < 1.60 \quad (8b)$$

Conditional expressions discussed above can be arbitrarily combined to achieve better effect of the present invention.

In the exemplary embodiments of the present invention, the first lens unit L1 includes, in order from an object side to the image side, a cemented lens of a negative lens and a positive lens, or a cemented lens of a positive lens and a negative lens, or a positive lens.

The second lens unit L2 includes, in order from an object side to the image side, a negative lens whose image side surface is a concave shape, a biconcave negative lens, and a positive lens, or a negative lens whose image side surface is a concave shape, and a positive lens.

The third lens unit L3 includes, in order from an object side to the image side, and a positive lens whose object side surface is convex, and a negative meniscus lens whose object side surface is convex toward the object side.

The fourth lens unit L4 includes a positive lens whose object side surface is convex shape.

According to the exemplary embodiments of the present invention, a zoom lens comprising of small number of lenses, having a short overall length, a zoom ratio of 8 to 10, and high optical performance can be achieved.

According to the exemplary embodiments of the present invention, a mechanical aperture FS having a fixed aperture diameter is arranged at the third lens unit L3. The mechanical aperture FS blocks a harmful light ray, which deteriorates optical performance of the zoom lens. The fixed aperture diameter of the mechanical aperture FS is appropriately set to a largest diameter which does not block an on-axis light ray when an off axis light ray enters at a height an on axis light ray passes and an off-axis light ray whose upper light ray becomes coma flare, and when an F-number is small in the entire zoom range. Accordingly, a coma flare of the upper light ray of the off-axis light ray can be blocked at a maximum. Then, optical performance of the entire zoom range can be improved.

Next, referring to FIG. 13, an embodiment of a digital still camera using the zoom lenses of the first to sixth embodiments as image taking optical systems is described.

In FIG. 13, the digital still camera includes: a camera main body 20; an image taking optical system 21 including any one of the zoom lenses of the first to sixth embodiments; a solid-state image pickup device (photoelectric conversion device) 22 such as a CCD sensor or a CMOS sensor, which is built in the camera main body to receive an object image formed by the image taking optical system 21; a memory 23 for recording information corresponding to the object image photoelectrically converted by the solid-state image pickup device 22; and a viewfinder 24 including a liquid crystal display panel to observe the object image formed on the solid-state image pickup device 22.

Thus, applying the zoom lens of the present invention to the image pickup apparatus such as a digital still camera enables realization of a compact and high optical performance image pickup apparatus.

Numerical Examples 1 to 6 according to Embodiments 1 to 6 will be described below.

In the respective Numerical Examples, the subscript "i" is a positive integer greater than zero. When referring to surface numbers, reference symbol with subscript i denotes the order of surfaces from the object side to the image side, reference symbol $r_i$ denotes an $i^{th}$ radius of curvature (at the $i^{th}$ plane), reference symbol $d_i$ denotes a distance between the $i^{th}$ plane and the $(i+1)^{th}$ plane, and reference symbols $nd_i$, $vd_i$ denote an index of refraction and an Abbe number of the material of an $i^{th}$ optical member with reference to the d-line respectively. Where present, aspherical surfaces are denoted by an asterisk ("*") added next to the surface number.

In each aspheric surface, a conic constant is denoted by k, aspherical coefficients are denoted by A3, A4, A5, A6, A8, A10, and A12 respectively, and a displacement in the direction of the optical axis at a position of height h from the optical axis is denoted by x with reference to an apex of the plane. An aspherical shape is denoted by an expression:

$$x = (h^2/R)/[1 + \{1-(1+k)(h/R)^2\}^{1/2}] + A3 \cdot h^3 + A4 \cdot h^4 + A5 \cdot h^5 + A6 \cdot h^6 + A7 \cdot h^7 + A8 \cdot h^8 + A10 \cdot h^{10} + A12 \cdot h^{12}$$

Note that a curvature radius is denoted by R. "e-z" means "$\times 10^{-z}$". In the numerical examples 1 to 6, two planes closest to the image are planes corresponding to the optical block such as a filter or a faceplate.

Each of "d10" in numerical example 1, "d8" in numerical example 4, and "d7" in numerical example 6 is a negative value, because it is described on the premise that the aperture stop is arranged on the object plane side of the positive lens that is disposed on the most object plane side of the third lens unit L3.

In each of the Embodiments, a back focus (BF) is expressed as an equivalent air length corresponding to a distance between a final lens surface and a paraxial image plane. The total lens length is obtained by adding the back focus to a distance between a surface closest to the object side and the final surface.

The relationships between the respective conditional expressions described above and the various numerical values in the numerical examples are shown in Table 1. Where applicable, units are given in millimeter (mm).

First Numerical Example

Unit: mm

Surface Data

| Surface No. | r | d | nd | vd | Effective Diameter |
|---|---|---|---|---|---|
| 1 | 21.145 | 0.50 | 1.92286 | 18.9 | 15.35 |
| 2 | 16.357 | 2.10 | 1.77250 | 49.6 | 14.54 |
| 3 | 91.251 | (Variable) | | | 13.85 |
| 4 | 107.994 | 0.30 | 1.80604 | 40.8 | 12.44 |
| 5* | 6.248 | 3.11 | | | 9.63 |
| 6 | −24.577 | 0.40 | 1.77250 | 49.6 | 9.46 |
| 7 | 37.208 | 0.10 | | | 9.39 |
| 8 | 12.545 | 1.37 | 1.95906 | 17.5 | 9.45 |
| 9 | 38.533 | (Variable) | | | 9.20 |
| 10(aperture) | ∞ | −0.40 | | | 4.57 |
| 11* | 4.438 | 1.56 | 1.58313 | 59.4 | 4.60 |
| 12* | −61.644 | 0.20 | | | 4.31 |
| 13 | 4.597 | 0.40 | 1.94595 | 18.0 | 3.95 |
| 14 | 3.260 | 1.40 | | | 3.59 |
| 15 | ∞ | (Variable) | | | 3.38 |
| 16 | 17.989 | 1.10 | 1.51633 | 64.1 | 8.06 |
| 17 | −286.294 | (Variable) | | | 8.08 |
| 18 | ∞ | 0.80 | 1.51633 | 64.1 | 15.00 |
| 19 | ∞ | 0.97 | | | 15.00 |
| Image Plane | ∞ | | | | |

Aspherical Surface Data

5th surface

K = 0.00000e+000 A4 = 2.11455e−005 A6 = 1.11207e−006
A8 = −4.97616e−008

11th surface

K = −1.01603e+000 A4 = 7.11630e−004 A6 = −2.05335e−005
A8 = 1.06051e−006

12th surface

K = −1.04272e+003 A4 = −1.51387e−004

Other data
Zoom Ratio 9.78

| | | | |
|---|---|---|---|
| Focal Length | 5.12 | 6.60 | 39.01 |
| F-number | 3.33 | 3.57 | 6.30 |
| Field Angle | 33.04 | 28.39 | 5.67 |
| Image Height | 3.33 | 3.56 | 3.88 |
| Overall Lens Length | 43.47 | 41.13 | 54.87 |
| BF | 0.97 | 0.97 | 0.97 |
| d3 | 0.30 | 1.68 | 16.35 |
| d9 | 19.20 | 14.50 | 0.97 |
| d15 | 5.69 | 5.35 | 16.70 |
| d17 | 4.37 | 5.68 | 6.93 |
| Entrance Pupil Position | 10.52 | 12.26 | 50.32 |
| Exit Pupil Position | −16.17 | −16.91 | −53.39 |
| Front Principal Point Position | 14.11 | 16.42 | 61.34 |
| Rear Principal Point Position | −4.16 | −5.63 | −38.04 |

Second Numerical Example

Unit: mm

Zoom Lens Unit Data

| Unit | First Surface | Focal Length | Thickness | Front Principal Point | Rear Principal Point |
|---|---|---|---|---|---|
| 1 | 1 | 37.69 | 2.60 | −0.55 | −1.97 |
| 2 | 4 | −8.23 | 5.28 | 0.21 | −4.05 |
| 3 | 10 | 11.46 | 3.16 | −1.95 | −3.94 |
| 4 | 16 | 32.82 | 1.10 | 0.04 | −0.68 |

Single Lens Data

| Lens | First Surface | Focal Length |
|---|---|---|
| 1 | 1 | −82.40 |
| 2 | 2 | 25.49 |
| 3 | 4 | −8.24 |
| 4 | 6 | −19.11 |
| 5 | 8 | 18.91 |
| 6 | 11 | 7.16 |
| 7 | 13 | −13.88 |
| 8 | 16 | 32.82 |

Second Numerical Example

Unit: mm

Surface Data

| Surface No. | r | d | nd | vd | Effective Diameter |
|---|---|---|---|---|---|
| 1 | 23.640 | 0.50 | 2.14352 | 17.8 | 19.22 |
| 2 | 20.076 | 3.00 | 1.72916 | 54.7 | 18.35 |
| 3 | 526.919 | (Variable) | | | 17.18 |
| 4* | 117.520 | 0.50 | 1.85135 | 40.1 | 11.09 |
| 5* | 5.536 | 2.79 | | | 8.40 |
| 6 | −17.976 | 0.30 | 1.61766 | 57.9 | 8.16 |
| 7 | 21.173 | 0.15 | | | 8.00 |
| 8 | 11.793 | 1.10 | 1.94595 | 18.0 | 8.00 |
| 9 | 41.899 | (Variable) | | | 7.80 |
| 10(aperture) | ∞ | 0.00 | | | 4.00 |
| 11* | 4.431 | 1.58 | 1.60801 | 63.6 | 4.14 |
| 12* | −38.150 | 0.25 | | | 3.92 |
| 13 | 4.986 | 0.55 | 1.94595 | 18.0 | 3.68 |
| 14 | 3.361 | 0.73 | | | 3.32 |
| 15 | ∞ | (Variable) | | | 3.29 |
| 16* | 9.497 | 1.28 | 1.55332 | 71.7 | 7.23 |
| 17* | 28.353 | (Variable) | | | 7.01 |
| 18 | ∞ | 0.80 | 1.51633 | 64.1 | 20.00 |
| 19 | ∞ | 2.42 | | | 20.00 |
| Image Plane | ∞ | | | | |

Aspherical Surface Data

4th surface

K = 3.61947e+002 A4 = −1.95585e−004 A6 = 6.69951e−006
A8 = −1.40824e−007 A10 = −5.75275e−010

5th surface

K = −5.89189e−001 A4 = 3.27647e−004 A6 = −4.65785e−006
A8 = 2.94644e−006 A10 = −1.08576e−007

11th surface

K = −7.59968e−002 A4 = −7.53170e−004 A6 = 4.48745e−005
A8 = −1.43274e−005 A10 = 2.18422e−006

12th surface

K = −3.84147e+001 A4 = 4.17036e−004 A6 = 1.13711e−004
A8 = −2.43349e−005 A10 = 3.66953e−006

16th surface

K = 9.77128e−001 A4 = 5.02537e−005 A6 = 1.38670e−005
A8 = 1.16733e−006 A10 = 9.66865e−008

17th surface

K = 2.28117e+001 A4 = 1.56496e−004 A6 = 4.88771e−005
A8 = −2.47583e−006 A10 = 3.13609e−007

Other data
Zoom Ratio 7.73

| | | | |
|---|---|---|---|
| Focal Length | 4.40 | 11.53 | 34.00 |
| F-number | 3.23 | 4.26 | 6.08 |
| Field Angle | 37.14 | 18.57 | 6.50 |
| Image Height | 3.33 | 3.88 | 3.88 |
| Overall Lens Length | 38.27 | 41.88 | 56.83 |
| BF | 2.42 | 2.42 | 2.42 |
| d 3 | 0.92 | 8.28 | 16.44 |
| d 9 | 14.46 | 5.72 | 0.95 |
| d15 | 3.83 | 5.92 | 14.98 |
| d17 | 3.11 | 6.03 | 8.51 |
| Entrance Pupil Position | 10.41 | 23.94 | 51.30 |
| Exit Pupil Position | −11.72 | −18.42 | −58.49 |
| Front Principal Point Position | 13.45 | 29.09 | 66.32 |
| Rear Principal Point Position | −1.98 | −9.11 | −31.58 |

Zoom Lens Unit Data

| Unit | First Surface | Focal Length | Thickness | Front Principal Point | Rear Principal Point |
|---|---|---|---|---|---|
| 1 | 1 | 37.50 | 3.50 | −0.28 | −2.24 |
| 2 | 4 | −6.54 | 4.84 | 0.36 | −3.56 |
| 3 | 10 | 10.03 | 3.11 | −1.57 | −3.34 |
| 4 | 16 | 25.20 | 1.28 | −0.41 | −1.21 |

Single Lens Data

| Lens | First Surface | Focal Length |
|---|---|---|
| 1 | 1 | −125.87 |
| 2 | 2 | 28.55 |
| 3 | 4 | −6.84 |
| 4 | 6 | −15.69 |
| 5 | 8 | 17.05 |
| 6 | 11 | 6.62 |
| 7 | 13 | −13.05 |
| 8 | 16 | 25.20 |

Third Numerical Example

Unit: mm

Surface Data

| Surface No. | r | d | nd | vd | Effective Diameter |
|---|---|---|---|---|---|
| 1 | 23.181 | 0.70 | 2.14352 | 17.8 | 18.48 |
| 2 | 20.208 | 3.00 | 1.65160 | 58.5 | 17.49 |
| 3 | 124.032 | (Variable) | | | 16.67 |
| 4* | 101.445 | 0.70 | 1.85135 | 40.1 | 12.55 |
| 5* | 6.376 | 3.21 | | | 9.24 |
| 6 | −20.647 | 0.55 | 1.61766 | 57.9 | 8.96 |
| 7 | 17.962 | 0.15 | | | 8.71 |
| 8 | 12.490 | 1.17 | 1.94595 | 18.0 | 8.73 |
| 9 | 44.187 | (Variable) | | | 8.53 |
| 10(aperture) | ∞ | 0.00 | | | 4.33 |
| 11* | 4.420 | 1.58 | 1.60801 | 63.6 | 4.50 |
| 12* | −43.444 | 0.25 | | | 4.26 |

-continued

Unit: mm

| | | | | | |
|---|---|---|---|---|---|
| 13 | 4.964 | 0.55 | 1.94595 | 18.0 | 3.96 |
| 14 | 3.340 | 0.73 | | | 3.55 |
| 15 | ∞ | (Variable) | | | 3.53 |
| 16* | 10.357 | 1.28 | 1.55332 | 71.7 | 7.91 |
| 17* | 35.807 | (Variable) | | | 7.77 |
| 18 | ∞ | 0.80 | 1.51633 | 64.1 | 20.00 |
| 19 | ∞ | 2.42 | | | 20.00 |
| Image Plane | ∞ | | | | |

Aspherical Surface Data

4th surface

K = 1.65312e+002 A4 = 1.43783e−004 A6 = 3.47224e−006
A8 = −2.07880e−007 A10 = 1.97588e−009

5th surface

K = −2.87386e−001 A4 = 3.90291e−004 A6 = 1.67461e−005
A8 = 5.81630e−007 A10 = −2.54468e−008

11th surface

K = −1.05698e−001 A4 = −7.23727e−004 A6 = 6.17574e−005
A8 = −1.38176e−005 A10 = 1.89643e−006

12th surface

K = −4.68533e+001 A4 = 4.03890e−004 A6 = 1.12883e−004
A8 = −1.86634e−005 A10 = 2.74382e−006

16th surface

K = −2.22524e+000 A4 = 3.24893e−004 A6 = −4.15533e−006
A8 = −2.09679e−006 A10 = 1.59232e−007

17th surface

K = −3.78909e+000 A4 = 1.85040e−004 A6 = 1.07268e−005
A8 = −4.24845e−006 A10 = 2.54174e−007

Other data
Zoom Ratio 9.49

| | | | |
|---|---|---|---|
| Focal Length | 4.39 | 10.03 | 41.70 |
| F-number | 2.97 | 4.00 | 6.08 |
| Field Angle | 37.19 | 21.12 | 5.31 |
| Image Height | 3.33 | 3.88 | 3.88 |
| Overall Lens Length | 39.83 | 39.23 | 66.10 |
| BF | 2.42 | 2.42 | 2.42 |
| d 3 | 0.70 | 4.69 | 23.68 |
| d 9 | 15.24 | 5.46 | 0.68 |
| d15 | 3.65 | 5.48 | 18.94 |
| d17 | 3.16 | 6.50 | 5.72 |
| Entrance Pupil Position | 11.05 | 15.76 | 77.80 |
| Exit Pupil Position | −11.48 | −18.01 | −108.01 |
| Front Principal Point Position | 14.05 | 20.86 | 103.75 |
| Rear Principal Point Position | −1.97 | −7.61 | −39.28 |

Zoom Lens Unit Data

| Unit | First Surface | Focal Length | Thickness | Front Principal Point | Rear Principal Point |
|---|---|---|---|---|---|
| 1 | 1 | 48.89 | 3.70 | −0.94 | −3.04 |
| 2 | 4 | −7.30 | 5.78 | 0.60 | −4.00 |
| 3 | 10 | 10.24 | 3.11 | −1.64 | −3.39 |
| 4 | 16 | 25.87 | 1.28 | −0.33 | −1.14 |

Single Lens Data

| Lens | First Surface | Focal Length |
|---|---|---|
| 1 | 1 | −157.59 |
| 2 | 2 | 36.63 |
| 3 | 4 | −8.02 |
| 4 | 6 | −15.47 |
| 5 | 8 | 18.08 |
| 6 | 11 | 6.68 |
| 7 | 13 | −12.92 |
| 8 | 16 | 25.87 |

Fourth Numerical Example

Unit: mm

Surface Data

| Surface No. | r | d | nd | vd | Effective Diameter |
|---|---|---|---|---|---|
| 1 | 24.427 | 0.60 | 1.92286 | 18.9 | 18.58 |
| 2 | 18.571 | 2.35 | 1.77250 | 49.6 | 17.55 |
| 3 | 90.126 | (Variable) | | | 16.97 |
| 4 | −73.756 | 0.30 | 1.80604 | 40.8 | 15.18 |
| 5* | 5.789 | 2.16 | | | 11.60 |
| 6 | 9.351 | 1.75 | 1.95906 | 17.5 | 11.84 |
| 7 | 15.293 | (Variable) | | | 11.37 |
| 8(aperture) | ∞ | −0.40 | | | 4.10 |
| 9* | 4.014 | 1.52 | 1.58313 | 59.4 | 4.12 |
| 10* | 61.920 | 0.20 | | | 3.75 |
| 11 | 4.145 | 0.40 | 1.94595 | 18.0 | 3.49 |
| 12 | 3.009 | 1.40 | | | 3.16 |
| 13 | ∞ | (Variable) | | | 3.10 |
| 14 | 16.735 | 1.09 | 1.51633 | 64.1 | 7.61 |
| 15 | −16310.269 | (Variable) | | | 7.68 |
| 16 | ∞ | 0.80 | 1.51633 | 64.1 | 15.00 |
| 17 | ∞ | 0.97 | | | 15.00 |
| Image Plane | ∞ | | | | |

Aspherical Surface Data

5th surface

K = −1.03001e+000 A4 = 3.35565e−004 A6 = 1.81345e−006
A8 = −9.10959e−009

9th surface

K = −7.80610e−001 A4 = 1.21611e−003 A6 = −1.61993e−005
A8 = 2.81257e−005

10th surface

K = −7.00000e+000 A4 = 1.15353e−003 A6 = −7.26556e−006
A8 = 3.60647e−005

Other data
Zoom Ratio 7.64

| | | | |
|---|---|---|---|
| Focal Length | 5.12 | 6.58 | 39.17 |
| F-number | 3.51 | 3.67 | 6.24 |
| Field Angle | 33.04 | 28.70 | 5.65 |
| Image Height | 3.33 | 3.60 | 3.88 |
| Overall Lens Length | 46.70 | 43.21 | 54.14 |
| BF | 0.97 | 0.97 | 0.97 |
| d 3 | 1.19 | 3.03 | 20.47 |
| d 7 | 23.41 | 17.47 | 0.70 |
| d13 | 5.24 | 4.49 | 15.55 |
| d15 | 3.71 | 5.08 | 4.28 |
| Entrance Pupil Position | 13.08 | 15.37 | 56.16 |
| Exit Pupil Position | −14.70 | −14.83 | −45.05 |
| Front Principal Point Position | 16.53 | 19.21 | 61.99 |
| Front Principal Point Position | −4.16 | −5.62 | −38.20 |

Zoom Lens Unit Data

| Unit | First Surface | Focal Length | Thickness | Front Principal Point | Rear Principal Point |
|---|---|---|---|---|---|
| 1 | 1 | 46.20 | 2.95 | −0.77 | −2.37 |
| 2 | 4 | −10.17 | 4.21 | −0.28 | −3.45 |
| 3 | 8 | 11.55 | 3.12 | −2.22 | −4.11 |
| 4 | 14 | 32.38 | 1.09 | 0.00 | −0.72 |

Single Lens Data

| Lens | First Surface | Focal Length |
|---|---|---|
| 1 | 1 | −88.28 |
| 2 | 2 | 29.85 |

-continued

Unit: mm

| | | |
|---|---|---|
| 3 | 4 | −6.65 |
| 4 | 6 | 21.93 |
| 5 | 9 | 7.29 |
| 6 | 11 | −14.00 |
| 7 | 14 | 32.38 |

Fifth Numerical Example

Unit: mm

Surface Data

| Surface No. | r | d | nd | vd | Effective Diameter |
|---|---|---|---|---|---|
| 1 | 28.731 | 3.08 | 1.77250 | 49.6 | 17.60 |
| 2 | −44.500 | 0.70 | 2.00069 | 25.5 | 17.26 |
| 3 | −660.947 | (Variable) | | | 16.82 |
| 4* | −40.853 | 1.20 | 1.85135 | 40.1 | 12.28 |
| 5* | 5.213 | 1.72 | | | 9.40 |
| 6 | 8.896 | 1.75 | 2.14352 | 17.8 | 9.64 |
| 7 | 14.622 | (Variable) | | | 9.07 |
| 8 | ∞ | 0.00 | | | 3.85 |
| 9* | 5.374 | 1.85 | 1.58313 | 59.4 | 3.89 |
| 10* | −14.960 | 0.40 | | | 3.65 |
| 11(aperture) | ∞ | 0.45 | | | 3.42 |
| 12 | 6.054 | 0.85 | 2.10205 | 16.8 | 3.17 |
| 13 | 3.810 | (Variable) | | | 2.77 |
| 14* | 15.137 | 1.37 | 1.69350 | 53.2 | 7.90 |
| 15* | −189.659 | (Variable) | | | 7.91 |
| 16 | ∞ | 0.80 | 1.51633 | 64.1 | 20.00 |
| 17 | ∞ | 0.51 | | | 20.00 |
| Image Plane | ∞ | | | | |

Aspherical Surface Data

4th surface

K = 0.00000e+000 A6 = −4.29818e−007 A8 = −1.13517e−008
A10 = 3.66708e−010
5th surface K = −4.92760e−001 A4 = 3.53753e−005 A6 = 1.44243e−005
A8 = −1.80771e−007 A10 = −2.63647e−008 A12 = 7.54152e−010
A3 = −2.16559e−004 A5 = −8.30673e−005
9th surface K = −7.94622e−001 A4 = −4.84231e−004 A6 = −4.57848e−005
A8 = 2.39707e−006 A10 = −1.24997e−006
10th surface K = 0.00000e+000 A4 = −5.05197e−005 A6 = −2.85175e−005
A8 = −9.18773e−006
14th surface K = −2.07258e−001 A4 = 1.70319e−004 A6 = −1.94233e−006
A8 = 6.77357e−008 A3 = −4.36930e−004
15th surface K = 0.00000e+000 A4 = −1.04916e−006

Other Data
Zoom Ratio 7.58

| | | | |
|---|---|---|---|
| Focal Length | 5.12 | 15.09 | 38.80 |
| F-number | 3.60 | 4.73 | 5.77 |
| Field Angle | 33.07 | 14.40 | 5.70 |
| Image Height | 3.33 | 3.88 | 3.88 |
| Overall Lens Length | 43.60 | 43.15 | 56.53 |
| BF | 0.51 | 0.51 | 0.51 |
| d 3 | 1.34 | 9.84 | 21.47 |
| d 7 | 18.06 | 4.29 | 0.95 |
| d13 | 6.59 | 5.85 | 13.48 |
| d15 | 2.93 | 8.49 | 5.95 |
| Entrance Pupil Position | 12.79 | 27.28 | 76.42 |
| Exit Pupil Position | −15.77 | −19.59 | −55.22 |
| Front Principal Point Position | 16.30 | 31.04 | 88.20 |
| Rear Principal Point Position | −4.61 | −14.58 | −38.29 |

Zoom Lens Unit Data

| Unit | First Surface | Focal Length | Thickness | Front Principal Point | Rear Principal Point |
|---|---|---|---|---|---|
| 1 | 1 | 42.68 | 3.78 | −0.25 | −2.32 |
| 2 | 4 | −8.32 | 4.67 | 0.22 | −2.88 |
| 3 | 8 | 10.57 | 3.55 | −2.50 | −3.81 |
| 4 | 14 | 20.27 | 1.37 | 0.06 | −0.75 |

Single Lens Data

| Lens | First Surface | Focal Length |
|---|---|---|
| 1 | 1 | 23.02 |
| 2 | 2 | −47.71 |
| 3 | 4 | −5.37 |
| 4 | 6 | 17.09 |
| 5 | 9 | 7.01 |
| 6 | 12 | −11.64 |
| 7 | 14 | 20.27 |

Sixth Numerical Example

Unit: mm

Surface Data

| Surface No. | r | d | nd | vd | Effective Diameter |
|---|---|---|---|---|---|
| 1 | 45.655 | 1.40 | 1.48749 | 70.2 | 15.58 |
| 2 | −145.547 | (Variable) | | | 14.87 |
| 3* | 1126.705 | 0.70 | 1.76802 | 49.2 | 12.95 |
| 4* | 4.678 | 2.30 | | | 9.63 |
| 5* | 9.872 | 1.50 | 2.00178 | 19.3 | 9.79 |
| 6* | 15.269 | (Variable) | | | 9.49 |
| 7(aperture) | ∞ | −0.50 | | | 4.73 |
| 8* | 4.340 | 1.80 | 1.55332 | 71.7 | 4.80 |
| 9* | −23.688 | 1.00 | | | 4.50 |
| 10* | 9.308 | 0.50 | 2.00178 | 19.3 | 4.00 |
| 11* | 4.843 | 0.60 | | | 3.70 |
| 12 | ∞ | (Variable) | | | 3.02 |
| 13 | 89.566 | 0.60 | 1.84666 | 23.9 | 4.93 |
| 14 | −27.475 | (Variable) | | | 5.01 |
| 15 | ∞ | 0.80 | 1.51633 | 64.1 | 15.00 |
| 16 | ∞ | 2.34 | | | 15.00 |
| Image Plane | ∞ | | | | |

Aspherical Surface Data

3rd surface

K = 2.52548e+004 A4 = −1.26590e−004
4th surface

K = −6.41412e−001 A4 = 6.67205e−005 A6 = 8.38319e−006
A8 = −2.12522e−007
5th surface K = 1.59032e+000 A4 = −7.16273e−004
6th surface K = −2.17489e+000 A4 = −6.21677e−004 A6 = 4.26433e−006
A8 = 3.17809e−008

-continued

Unit: mm

8th surface

K = −6.26431e−001 A4 = 5.61436e−004 A6 = 4.66623e−005
A8 = 1.40195e−006
9th surface K = −1.76634e+001 A4 = 7.84352e−004
10th surface K = −1.40066e+000 A4 = −7.19348e−004
11th surface K = −1.82931e+000 A4 = 1.85429e−003 A6 = 1.18881e−004
A8 = 1.49330e−005

Other Data
Zoom Ratio 6.68

| Focal Length | 4.42 | 8.82 | 29.50 |
|---|---|---|---|
| F-number | 3.22 | 4.31 | 7.29 |
| Field Angle | 37.03 | 23.72 | 7.48 |
| Image Height | 3.33 | 3.88 | 3.88 |
| Overall Lens Length | 39.88 | 36.70 | 61.56 |
| BF | 2.34 | 2.34 | 2.34 |
| d 2 | 0.60 | 4.20 | 23.01 |
| d 6 | 18.90 | 8.35 | 1.20 |
| d12 | 2.83 | 2.83 | 6.35 |
| d14 | 4.51 | 8.29 | 17.96 |
| Entrance Pupil Position | 8.70 | 11.74 | 42.97 |
| Exit Pupil Position | −11.77 | −15.55 | −32.11 |
| Front Principal Point Position | 11.73 | 16.21 | 47.21 |
| Rear Principal Point Position | −2.08 | −6.48 | −27.16 |

Zoom Lens Unit Data

| Unit | First Surface | Focal Length | Thickness | Front Principal Point | Rear Principal Point |
|---|---|---|---|---|---|
| 1 | 1 | 71.46 | 1.40 | 0.23 | −0.72 |
| 2 | 3 | −8.68 | 4.50 | 0.01 | −3.41 |
| 3 | 7 | 11.24 | 3.40 | −3.01 | −4.54 |
| 4 | 13 | 24.89 | 0.60 | 0.25 | −0.08 |

Single Lens Data

| Lens | First Surface | Focal Length |
|---|---|---|
| 1 | 1 | 71.46 |
| 2 | 3 | −6.12 |
| 3 | 5 | 24.48 |
| 4 | 8 | 6.78 |
| 5 | 10 | −10.67 |
| 6 | 13 | 24.89 |

TABLE 1

| | | | Numerical example | | | | |
|---|---|---|---|---|---|---|---|
| CONDITION | | 1 | 2 | 3 | 4 | 5 | 6 |
| (1) | (β3t/β3w)/(β2t/β2w) | 1.354 | 2.086 | 1.618 | 1.285 | 1.098 | 11.380 |
| (2) | T12/ft | 0.202 | 0.245 | 0.227 | 0.183 | 0.218 | 0.200 |
| (3) | |f2|/fw | 1.605 | 1.486 | 1.661 | 1.984 | 1.626 | 1.963 |
| (4) | N2d_ave | 1.846 | 1.805 | 1.805 | 1.883 | 1.997 | 1.885 |
| (5) | f1/fw | 7.354 | 8.523 | 11.131 | 9.016 | 8.340 | 16.174 |
| (6) | f3/fw | 2.237 | 2.281 | 2.332 | 2.255 | 2.066 | 2.544 |
| (7) | f1p/fw | 4.973 | 6.489 | 8.339 | 5.826 | 4.499 | 16.174 |
| (8) | f3p/fw | 1.397 | 1.505 | 1.521 | 1.423 | 1.371 | 1.535 |

This application claims the benefit of Japanese Patent Application No. 2011-065870, filed Mar. 24, 2011, which is hereby incorporated by reference herein in its entirety.

What is claimed is:

1. A zoom lens, comprising, in order from an object side to an image side:

a first lens unit having a positive refractive power;

a second lens unit having a negative refractive power;

a third lens unit having a positive refractive power; and a fourth lens unit having a positive refractive power, each of the first lens unit, the second lens unit, the third lens unit, and the fourth lens unit moving along an optical axis of the zoom lens from a wide-angle end to a telephoto end to perform zooming, wherein the first lens unit includes not more than two lenses, the second lens unit includes not more than three lenses including at least a positive lens and a negative lens, the third lens unit includes a single lens having a positive refractive power and a single lens having a negative power in order from the object side to the image side, and the fourth lens unit consists of a single lens, and wherein the following conditions are satisfied:

$$1.0 < (\beta 3t/\beta 3w)/(\beta 2t/\beta 2w)$$

$$T12/ft < 0.30$$

$$0.8 < |f2|/fw < 5.0$$

where β3t and β3w are imaging magnifications on the telephoto end and the wide-angle end of the third lens unit, β2t and β2w are imaging magnifications on the telephoto end and the wide-angle end of the second lens unit, T12 is a sum of thicknesses on the optical axis of the first lens unit and the second lens unit, f2 is a focal length of the second lens unit, ft and fw are focal lengths at the telephoto end and the wide-angle end of the entire zoom lens.

2. A zoom lens according to claim 1, wherein the following condition is satisfied:

$$1.80 < N2d\_ave < 2.40$$

where N2d_ave is an average value of refractive indices of materials of lenses constituting the second lens unit with respect to d-line light.

3. A zoom lens according to claim 1, wherein the following condition is satisfied:

$$4.0 < f1/fw$$

where f1 is a focal length of the first lens unit.

4. A zoom lens according to claim 1, wherein the following condition is satisfied:

$$1.80 < f3/fw < 3.00$$

where f3 is a focal length of the third lens unit.

5. A zoom lens according to claim 1, wherein the following condition is satisfied:

$$3.5 < f1p/fw < 20.00$$

where f1p is a focal length of a positive lens constituting the first lens unit.

6. A zoom lens according to claim 1, wherein the following condition is satisfied:

$$0.80 < f3p/fw < 2.00$$

where f3p is a focal length of a positive lens constituting the third lens unit.

7. A zoom lens according to claim 1, wherein:

the first lens unit consists of, in order from the object side to the image side, a cemented lens in which a negative lens element and a positive lens element are cemented together, or a positive lens;

the second lens unit consist of, in order from the object side to the image side, a negative lens whose optical surface on the image side thereof has a concave shape, a negative lens having a biconcave shape, and a positive lens, or a negative lens whose optical surface on the image side thereof has a concave shape, and a positive lens;

the third lens unit consists of, in order from the object side to the image side, a positive lens whose optical surface on the object side thereof has a convex shape, and a negative lens having a meniscus shape convex towards the object side; and the fourth lens unit consists of a positive lens whose optical surface on the object side thereof has a convex shape.

8. A zoom lens according to claim 1, wherein the zoom lens forms an image on an image pickup device located at an image plane of the zoom lens.

9. An image pickup apparatus comprising:
a zoom lens; and
an image pickup device configured to receive light of an image formed by the zoom lens,
wherein the zoom lens comprises, in order from an object side to an image side:
a first lens unit having a positive refractive power;
a second lens unit having a negative refractive power;
a third lens unit having a positive refractive power; and
a fourth lens unit having a positive refractive power,
each of the first lens unit, the second lens unit, the third lens unit, and the fourth lens unit moving along an optical axis of the zoom lens from a wide-angle end to a telephoto end to perform zooming,
wherein the first lens unit includes not more than two lenses, the second lens unit includes not more than three lenses including at least a positive lens and a negative lens, the third lens unit includes a single lens having a positive refractive power and a single lens having a negative refractive power in order from the object side to the image side, and the fourth lens unit consists of a single lens, and
wherein the following conditions are satisfied:

$1.0 < (\beta 3t/\beta 3w)/(\beta 2t/\beta 32w)$ $T12/ft < 0.30$ $0.8 < |f2|/fw < 5.0$ where β3t and β3w are imaging magnifications on the telephoto end and the wide-angle end of the third lens unit, β2t and β2w are imaging magnifications on the telephoto end and the wide-angle end of the second lens unit, T12 is a sum of thicknesses on the optical axis of the first lens unit and the second lens unit, f2 is a focal length of the second lens unit, and ft and fw are focal lengths at the telephoto end and the wide-angle end of the entire zoom lens.

10. A zoom lens, comprising, in order from an object side to an image side:
a first lens unit having a positive refractive power;
a second lens unit having a negative refractive power;
a third lens unit having a positive refractive power; and
a fourth lens unit having a positive refractive power,
each of the first lens unit, the second lens unit, the third lens unit, and the fourth lens unit moving along an optical axis of the zoom lens from a wide-angle end to a telephoto end to perform zooming,
wherein the first lens unit includes not more than two lenses, the second lens unit includes not more than three lenses including at least a positive lens and a negative lens, the third lens unit the third lens unit consists of two lenses, and the fourth lens unit consists of a single lens, and
wherein the following conditions are satisfied:

$1.0 < (\beta 3t/\beta 3w)/(\beta 2t/\beta 2w) \leq 2.086$ $T12/ft < 0.30$ $0.8 < |f2|/fw < 5.0$ where β3t and β3w are imaging magnifications on the telephoto end and the wide-angle end of the third lens unit, β2t and β2w are imaging magnifications on the telephoto end and the wide-angle end of the second lens unit, T12 is a sum of thicknesses on the optical axis of the first lens unit and the second lens unit, f2 is a focal length of the second lens unit, and ft and fw are focal lengths at the telephoto end and the wide-angle end of the entire zoom lens.

11. A zoom lens according to claim 10, wherein the following condition is satisfied:

$1.80 < N2d\_ave < 2.40$ where N2d_ave is an average value of refractive indices of materials of lenses constituting the second lens unit with respect to d-line light.

12. A zoom lens according to claim 10, wherein the following condition is satisfied:

$4.0 < f1/fw$ where f1 is a focal length of the first lens unit.

13. A zoom lens according to claim 10, wherein the following condition is satisfied:

$1.80 < f3/fw < 3.00$ where f3 is a focal length of the third lens unit.

14. A zoom lens according to claim 10, wherein the following condition is satisfied:

$3.5 < f1p/fw < 20.00$ where f1p is a focal length of a positive lens constituting the first lens unit.

15. A zoom lens according to claim 10, wherein the following condition is satisfied:

$0.80 < f3p/fw < 2.00$ where f3p is a focal length of a positive lens constituting the third lens unit.

16. A zoom lens according to claim 10, wherein:
the first lens unit consists of, in order from the object side to the image side, a cemented lens in which a negative lens element and a positive lens element are cemented together, or a positive lens;
the second lens unit consist of, in order from the object side to the image side, a negative lens whose optical surface on the image side thereof has a concave shape, a negative lens having a biconcave shape, and a positive lens, or a negative lens whose optical surface on the image side thereof has a concave shape, and a positive lens;
the third lens unit consists of, in order from the object side to the image side, a positive lens whose optical surface on the object side thereof has a convex shape, and a negative lens having a meniscus shape convex towards the object side; and
the fourth lens unit consists of a positive lens whose optical surface on the object side thereof has a convex shape.

17. A zoom lens according to claim 10, wherein the zoom lens forms an image on an image pickup device located at an image plane of the zoom lens.

18. An image pickup apparatus comprising:
a zoom lens; and
an image sensor configured to receive an image formed by the zoom lens
wherein the zoom lens comprises, in order from an object side to an image side:
a first lens unit having a positive refractive power;
a second lens unit having a negative refractive power;
a third lens unit having a positive refractive power; and
a fourth lens unit having a positive refractive power,
each of the first lens unit, the second lens unit, the third lens unit, and the fourth lens unit moving along an optical axis of the zoom lens from a wide-angle end to a telephoto end to perform zooming,
wherein the first lens unit includes not more than two lenses, the second lens unit includes not more than three lenses including at least a positive lens and a negative lens, the third lens unit the third lens unit consists of two lenses, and the fourth lens unit consists of a single lens, and
wherein the following conditions are satisfied:

$1.0 < (\beta 3t/(\beta 3w))/(\beta 2t/(\beta 2w)) \leq 2.086$ (the upper limit is defined by the value in the second numerical example)

$T12/ft < 0.30$ $0.8 < |f2|/fw < 5.0$ where $\beta 3t$ and $\beta 3w$ are imaging magnifications on the telephoto end and the wide-angle end of the third lens unit, $\beta 2t$ and $\beta 2w$ are imaging magnifications on the telephoto end and the wide-angle end of the second lens unit, T12 is a sum of thicknesses on the optical axis of the first lens unit and the second lens unit, f2 is a focal length of the second lens unit, and ft and fw are focal lengths at the telephoto end and the wide-angle end of the entire zoom lens.

* * * * *